United States Patent
Takahashi

(10) Patent No.: US 12,392,950 B2
(45) Date of Patent: Aug. 19, 2025

(54) OPTICAL DEVICE, METHOD FOR MANUFACTURING OPTICAL DEVICE, AND IMAGE DISPLAY DEVICE

(71) Applicant: SONY GROUP CORPORATION, Tokyo (JP)

(72) Inventor: Atsushi Takahashi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 413 days.

(21) Appl. No.: 17/906,538

(22) PCT Filed: Mar. 9, 2021

(86) PCT No.: PCT/JP2021/009290
§ 371 (c)(1),
(2) Date: Sep. 16, 2022

(87) PCT Pub. No.: WO2021/199958
PCT Pub. Date: Oct. 7, 2021

(65) Prior Publication Data
US 2023/0133805 A1 May 4, 2023

(30) Foreign Application Priority Data
Mar. 31, 2020 (JP) .................... 2020-064863

(51) Int. Cl.
*G02B 27/42* (2006.01)
*F21V 8/00* (2006.01)
*G02B 6/00* (2006.01)

(52) U.S. Cl.
CPC ........... *G02B 6/0023* (2013.01); *G02B 6/005* (2013.01); *G02B 27/4205* (2013.01)

(58) Field of Classification Search
CPC .. G02B 6/0023; G02B 6/005; G02B 27/0081; G02B 27/0103; G02B 27/0172;
(Continued)

(56) References Cited

U.S. PATENT DOCUMENTS

2018/0210205 A1\* 7/2018 Grey .................. G02B 27/4272
2019/0285796 A1    9/2019 Waldern et al.
(Continued)

FOREIGN PATENT DOCUMENTS

CN     110764261 A    2/2020
JP     2017-504063 A  2/2017
(Continued)

OTHER PUBLICATIONS

English language translation of Chinese Patent Publication No. CN 111025657, downloaded on Apr. 4, 2025 from Espacenet at https://worldwide.espacenet.com/. English language translation provided by Google Translate tool on-site. (Year: 2020).\*
(Continued)

*Primary Examiner* — Angela M. Medich
(74) *Attorney, Agent, or Firm* — CHIP LAW GROUP

(57) ABSTRACT

Provided is an optical device that includes a light guide plate that totally reflects and guides incident light, a first optical element on the light guide plate, an input optical element that is on the light guide plate and introduces the incident light into the light guide plate, a second optical element that is on the light guide plate and bends light propagated by total reflection in the light guide plate, and an output optical element that is on the light guide plate and emits light propagated by total reflection in the light guide plate, to an outside of the light guide plate. The first optical element has substantially the same grating vector as a grating vector of the input optical element, and the first optical element and the input optical element face each other with the second optical element interposed therebetween.

13 Claims, 33 Drawing Sheets

(58) Field of Classification Search
CPC ........ G02B 27/4205; G02B 5/32; G02B 5/18; G02B 5/1814; G02B 5/1819; G02B 2027/0174
See application file for complete search history.

(56) References Cited

U.S. PATENT DOCUMENTS

| | | | |
|---|---|---|---|
| 2021/0215942 A1* | 7/2021 | Olkkonen | G02B 27/0172 |
| 2022/0026619 A1* | 1/2022 | Park | G02B 27/4205 |

FOREIGN PATENT DOCUMENTS

| | | |
|---|---|---|
| JP | 2019-517014 A | 6/2019 |
| WO | 2019/139440 A1 | 7/2019 |

OTHER PUBLICATIONS

International Search Report and Written Opinion of PCT Application No. PCT/JP2021/009290, issued on May 25, 2021, 09 pages of ISRWO.

* cited by examiner

OPTICAL DEVICE, METHOD FOR MANUFACTURING OPTICAL DEVICE, AND IMAGE DISPLAY DEVICE

CROSS REFERENCE TO RELATED APPLICATIONS

This application is a U.S. National Phase of International Patent Application No. PCT/JP2021/009290 filed on Mar. 9, 2021, which claims priority benefit of Japanese Patent Application No. JP 2020-064863 filed in the Japan Patent Office on Mar. 31, 2020. Each of the above-referenced applications is hereby incorporated herein by reference in its entirety.

TECHNICAL FIELD

The present technology relates to an optical device, a method for manufacturing the optical device, and an image display device.

BACKGROUND ART

In recent years, attention has been focused on a technology related to a display (for example, a head-mounted display (HMD)) that displays an image from an image forming apparatus on an optical device disposed in front of an observer's eyes.

For example, Patent Document 1 proposes a technology related to a display including a flat optical waveguide portion, an input diffraction grating, an intermediate diffraction grating, and an output diffraction grating. In this technology, the input diffraction grating is positioned to be entirely positioned in a geographical area of the intermediate diffraction grating, and a grating vector of the input diffraction grating and a grating vector of the intermediate diffraction grating are oriented in different directions.

CITATION LIST

Patent Document

Patent Document 1: Japanese Published Patent Publication No. 2017-504063

SUMMARY OF THE INVENTION

Problems to be Solved by the Invention

However, in the technology proposed in Patent Document 1, it is sometimes difficult to make the sum of the grating vectors of diffraction gratings (optical elements) formed in the optical waveguide portion (light guide plate) zero, and there is a possibility that further improvement of optical characteristics cannot be achieved.

In this regard, the present technology has been made in view of such a situation, and a main object of the present technology is to provide an optical device capable of easily making a sum of grating vectors of optical elements disposed on a light guide plate zero and realizing further improvement of optical characteristics, a method for manufacturing the optical device, and an image display device including the optical device.

Solutions to Problems

As a result of intensive studies to solve the above-described object, the present inventors have surprisingly succeeded in realizing further improvement of optical characteristics and have completed the present technology.

That is, in a first aspect according to the present technology,
there is provided an optical device including:
a light guide plate that totally reflects and guides incident light;
a first optical element that is disposed on the light guide plate;
an input optical element that is disposed on the light guide plate and introduces the incident light into the light guide plate;
a second optical element that is disposed on the light guide plate and bends light propagated by total reflection in the light guide plate, in a direction different from a direction of the light; and
an output optical element that is disposed on the light guide plate and emits light propagated by total reflection in the light guide plate, to an outside of the light guide plate, in which
the first optical element has substantially the same grating vector as a grating vector of the input optical element, and
the first optical element and the input optical element are disposed to face each other with the second optical element interposed therebetween.

The optical device according to the first aspect of the present technology further may include:
a plurality of the first optical elements; a plurality of the input optical elements; a plurality of the second optical elements; and a plurality of the output optical elements.

Each of the plurality of first optical elements, the plurality of input optical elements, the plurality of second optical elements, and the plurality of output optical elements may have a laminated structure.

In the optical device according to the first aspect of the present technology,
the light guide plate may have a first surface and a second surface facing the first surface,
the first optical element, the input optical element, and the output optical element may be disposed on the first surface of the light guide plate, and
the second optical element may be disposed on the second surface of the light guide plate.

The optical device according to the first aspect of the present technology further may include:
a plurality of the first optical elements; a plurality of the input optical elements; a plurality of the second optical elements; and a plurality of the output optical elements.

The input optical element, the second optical element, and the first optical element may be disposed in this order on the light guide plate,
one set including the input optical element, the second optical element, and the first optical element may be repeatedly disposed, and
the plurality of output optical elements may have a laminated structure.

The optical device according to the first aspect of the present technology further may include:
a plurality of the first optical elements; and a plurality of the input optical elements.

The plurality of first optical elements and the plurality of input optical elements may be disposed to face each other with the second optical element interposed therebetween.

In the optical device according to the first aspect of the present technology, the light guide plate may have a first surface and a second surface facing the first surface, the input optical element may be disposed on the first surface of the light guide plate, the first optical element may be disposed on the second surface of the light guide plate, the second optical element may be disposed in the light guide plate, and the first optical element and the input optical element may be disposed to face each other with the second optical element interposed therebetween.

Furthermore, in a second aspect according to the present technology, there is provided an optical device including:

a light guide plate that totally reflects and guides incident light;

a first optical element that is disposed on the light guide plate;

an input optical element that is disposed on the light guide plate and introduces the incident light into the light guide plate;

a second optical element that is disposed on the light guide plate and bends light propagated by total reflection in the light guide plate, in a direction different from a direction of the light; and an output optical element that is disposed on the light guide plate and emits light propagated by total reflection in the light guide plate, to an outside of the light guide plate, in which the first optical element has substantially the same grating vector as a grating vector of the output optical element, and the first optical element and the output optical element are disposed to face each other with the second optical element interposed therebetween.

In the optical device according to the first aspect and the optical device according to the second aspect of the present technology, the input optical element may include a light reflecting member.

In the optical device according to the first aspect and the optical device according to the second aspect of the present technology, the second optical element may be a reflection type or transmission type volume hologram.

Further, in a third aspect according to the present technology, provided an optical device including:

a light guide plate that totally reflects and guides incident light;

a first optical element that is disposed on the light guide plate;

an input optical element that is disposed on the light guide plate and introduces the incident light into the light guide plate;

a second optical element that is disposed on the light guide plate and bends light propagated by total reflection in the light guide plate, in a direction different from a direction of the light;

a third optical element that is disposed on the light guide plate; and an output optical element that is disposed on the light guide plate and emits light propagated, by total reflection, in the light guide plate to the outside of the light guide plate, in which the first optical element has substantially the same grating vector as a grating vector of the second optical element, the third optical element has substantially the same grating vector as a grating vector of the input optical element, and the first optical element and the third optical element, and the second optical element and the input optical element are disposed to face each other with the output optical element interposed therebetween.

In the optical device according to the third aspect of the present technology, the input optical element may include a light reflecting member.

In the optical device according to the third aspect of the present technology, the output optical element may be a reflection type or transmission type volume hologram.

In a fourth aspect according to the present technology, there is provided an image display device including:

an image forming apparatus; and an optical device where light emitted from the image forming apparatus is incident, guided, and emitted, in which the optical device includes the optical device of the first aspect according to the present technology, the optical device of the second aspect according to the present technology, or the optical device of the third aspect according to the present technology.

Furthermore, in a fifth aspect according to the present technology, there is provided a method of manufacturing an optical device including:

forming an input optical element on a light guide plate;

forming a first optical element on the light guide plate, the first optical element having substantially the same grating vector as a grating vector of the input optical element;

forming an output optical element on the light guide plate; and forming a second optical element by using an interference between first diffracted light obtained when reference light having a substantially opposite vector to a vector included in reproduction reference light is incident on the first optical element and second diffracted light obtained when object light having a substantially opposite vector to a vector included in reproduction light is incident on the output optical element.

In a sixth aspect according to the present technology, there is provided a method of manufacturing an optical device including:

forming an input optical element on a light guide plate;

forming an output optical element on the light guide plate;

forming a first optical element on the light guide plate, the first optical element having substantially the same grating vector as a grating vector of the output optical element; and forming a second optical element by using an interference between third diffracted light obtained when object light having substantially the same vector as a vector of reproduction light is incident on the first optical element and fourth diffracted light obtained when reference light having substantially the same vector as a vector of reproduction reference light is incident on the input optical element.

In a seventh aspect according to the present technology, there is provided a method of manufacturing an optical device including:

forming an input optical element on a light guide plate;

forming a second optical element on the light guide plate;

forming a first optical element on the light guide plate, the first optical element having substantially the same grating vector as a grating vector of the second optical element;

forming a third optical element on the light guide plate, the third optical element having substantially the same grating vector as a grating vector of the input optical element; and forming an output optical element by using an interference between fifth diffracted light, which is obtained when reference light having a substantially opposite vector to a vector of reproduction reference light is incident on the third optical element, and light emitted from the third optical element is incident on the first optical element, and object light having a substantially opposite vector to the vector of the reproduction light.

According to the present technology, the sum of the grating vectors of the optical elements disposed on the light guide plate can be easily made zero, and the optical characteristics can be further improved. Note that the effects described herein are not necessarily limited, and may be any of the effects described in the present disclosure.

BRIEF DESCRIPTION OF DRAWINGS

FIG. 24B is a vector diagram of the production optical path from the first optical element illustrated in FIG. 24A.

FIG. 25B is a vector diagram of the production optical path from the first optical element illustrated in FIG. 25A.

MODE FOR CARRYING OUT THE INVENTION

Figure 1:
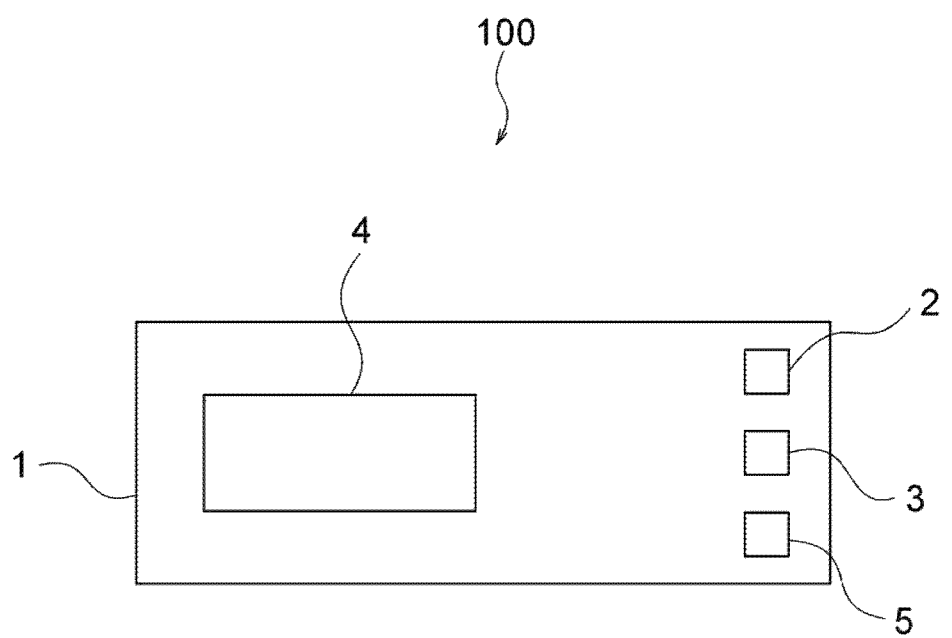
FIG. 1 is a diagram illustrating a configuration example of an optical device of a first embodiment to which the present technology is applied.
Figure 1:
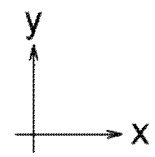

Hereinafter, preferred modes for carrying out the present technology will be described. An embodiment described below illustrates an example of a representative embodiment of the present technology, and the scope of the present technology is not narrowly interpreted by the embodiment. Note that in the description using the drawings, the same or equivalent elements or members are denoted by the same reference sign, and redundant description is omitted. Furthermore, the size of the circle illustrated in each vector diagram merely represents a reference for comparing the sizes of a plurality of vectors in the one diagram, and does not represent a reference for comparing the sizes of a plurality of vectors between the diagrams.

Note that the description will be given in the following order.

1. Outline of Present Technology
2. First embodiment (Example 1 of Optical Device and Example 1 of Method for Manufacturing Optical Device)
3. Second Embodiment (Example 2 of Optical Device)
4. Third Embodiment (Example 3 of Optical Device)
5. Fourth Embodiment (Example 4 of Optical Device)
6. Fifth Embodiment (Example 5 of Optical Device)
7. Sixth Embodiment (Example 6 of Optical Device and Example 2 of Method for Manufacturing Optical Device)
8. Seventh Embodiment (Example 7 of Optical Device and Example 3 of Method for Manufacturing Optical Device)
9. Eighth Embodiment (Example of Image Display Device)

1. Outline of Present Technology

First, an outline of the present technology will be described. The present technology relates to an optical device, a method for manufacturing the optical device, and an image display device.

First, an example of a technology different from the present technology will be described.

As Example 1 of the different technology, there is a technology for reducing deterioration of optical characteristics such as a monochrome eccentric aberration and a diffraction chromatic aberration in a light guide plate.

In Example 1, reflection type volume holographic gratings which capture and emit light in the light guide plate are arranged symmetrically with a predetermined symmetry plane interposed therebetween, thereby compensating for aberration due to diffraction and reducing the deterioration of optical characteristics. When the symmetric relationship is broken, the compensation effect is lost, and the optical characteristics are deteriorated. It is not clear how to realize the symmetrical arrangement.

As Example 2 of the different technology, there is a technology of obtaining a wide viewing angle in a single plate full color in the light guide plate.

Example 2 includes a design for achieving a large FoV (for example, 45×30°) in a single waveguide for a plurality of different wavelengths. The sum of grating vectors of diffractive optical elements (DOEs) formed on the light guide plate (waveguide) becomes zero. However, it is not clear how to close the grating vector.

As Example 3 of the different technology, there is a technology of adjusting the grating vector while aligning the grating vector at the time of producing a sample in the light guide plate.

Example 3 is a technology of a method of adjusting each grating vector in a so-called biaxial light guide system. Furthermore, there is also a technology of trying to reduce the misalignment of the grating vector by pressing one overall grating structure having a common orientation. However, in the above-described method, it is necessary to change the direction of the vector with a mirror, and it is necessary to prepare a highly accurate reflection surface at a waveguide end. In this regard, in Example 3, a diffractive optical element (DOE) structure necessary for input is produced from the back surface of the light guide plate (mirror is unnecessary), a plurality of light beams is guided at the time of production, and an alignment is performed while observing the state of the emitted light, thereby reducing the misalignment and suppressing the deterioration of optical characteristics.

As described above, there is a technology of suppressing aberration in the light guide plate by arranging reflection type volume holograms symmetrically with respect to the predetermined symmetry plane. Furthermore, there is a technology that can realize a single plate, a full color, and a high viewing angle by making the sum of grating vectors of the DOEs arranged on the light guide plate zero. In addition, in order to reduce luminance unevenness and color unevenness, there is a technology of continuously changing the inclination of an interference fringe to satisfy the Bragg condition.

In these technologies, a desired effect can be obtained by making an arrangement such that the sum of the grating vectors of the optical elements formed on the light guide plate becomes zero. However, a specific method for realizing the sum of the grating vectors to be zero is not clear in each technology. In order to realize the sum of the grating vectors to be zero, a technology of producing the grating vector with high accuracy and a technology of aligning a relative positional relationship with each grating vector are required, and there are many cases where it is difficult to form the volume hologram and the DOE.

As described above, as a technology for reducing the misalignment of the grating vectors, there is a technology for forming the DOE while observing reproduction light. By using a UV (ultraviolet) curable resin and an imprinting process, an alignment is made in an uncured state, and curing is performed to form the grating vector. However, a high alignment accuracy is still required. In addition, in the imprinting process, it is necessary to peel off an original plate after the alignment, and it is conceivable that the original plate is displaced from an alignment position in the process. Therefore, there are many cases where it is difficult to apply the technology to a complex shape such as an oblique interference fringe that is difficult to demold.

The present technology has been made in view of the above circumstances.

In the present technology, an input optical element, a second optical element (referred to as an intermediate grating in some cases) (the same applies hereinafter), an output optical element, and a first optical element are disposed on the light guide plate. Then, at least one optical element among the input optical element, the second optical element, the output optical element, and the first optical element may be formed as a separate element on the light guide plate or may be formed as an element (for example, an element including an uneven portion formed on the light guide plate) integrated with the light guide plate.

In the present technology, the first optical element may have substantially the same grating vector as the grating vector of the input optical element and be disposed to face the input optical element with the second optical element interposed therebetween. At this time, it is not necessary to make a symmetrical arrangement, and it is sufficient if the arrangement is made such that the vectors of the light introduced into the light guide plate overlap each other on the second optical element by the input optical element and the first optical element. Furthermore, in the present technology, the first optical element may have substantially the same grating vector as the grating vector of the output optical element and be disposed to face the output optical element with the second optical element interposed therebetween, or the first optical element may have substantially the same grating vector as the grating vector of the second optical element and be disposed to face the second optical element with the output optical element interposed therebetween.

Further, in the present technology, for example, the second optical element may include a volume hologram, and in this case, and each optical element except the second optical element is not limited as long as it is possible to totally reflect light in the light guide plate and emit the light to the outside of the light guide plate. The input optical element and the first optical element (referred to as a production optical element in some cases) are desirably elements having high coupling efficiency of light to the light guide plate, and are desirably diffraction elements in which a metal film is deposited on the DOE. Then, the sum of the grating vectors by the second optical element, the input optical element, and the output optical element is zero (the grating vectors are closed). Furthermore, in the present technology, for example, the output optical element may include a volume hologram, and in that case, a reflection type volume hologram is desirable in order to prevent stray light due to external light.

As a material (a photopolymer material configuring a photosensitive material precursor layer before irradiation with object light and reference light) configuring the volume hologram, any photopolymer material can be used as long as the material includes at least a photopolymerizable compound, a binder resin, and a photopolymerization initiator.

As the photopolymerizable compound, for example, known photopolymerizable compounds such as an acrylic monomer, a methacrylic monomer, a styrene monomer, a butadiene monomer, a vinyl monomer, and an epoxy monomer can be used. The compounds may be copolymers or may be monofunctional or polyfunctional. Furthermore, these monomers may be used alone or in combination. Also for the binder resin, any known binder resin can be used, and specific examples thereof include a cellulose acetate resin, an acrylic resin, an acrylic acid ester resin, a methacrylic acid resin, an epoxy resin, a urethane resin, a polypropylene resin, a polyvinyl ether resin, a polycarbonate resin, a polyamide resin, polyvinyl acetate, a vinyl chloride resin, a urea resin, a styrene resin, a butadiene resin, a natural rubber resin, polyvinyl carbazole, polyethylene glycol, a phenol resin, or a copolymer or gelatin thereof.

The binder resins may be used alone or in combination. Also for the photopolymerization initiator, any known photopolymerization initiator can be used.

The photopolymerization initiator may be used alone, in combination of a plurality of photopolymerization initiators, or in combination with a plurality of or a single photosensitizing dye.

A plasticizer, a chain transfer agent, and other additives may be appropriately added to the photosensitive material precursor layer. As a material configuring the protective layer for protecting a volume hologram diffraction grating, any material can be used as long as the material is transparent, and the material may be formed by coating, or a previously formed film may be laminated on the photosensitive material precursor layer. Examples of a material configuring the protective layer include a polyvinyl alcohol (PVA) resin, an acrylic resin, a polyurethane resin, a polyethylene terephthalate (PET) resin, a triacetyl cellulose (TAC) resin, a polymethyl methacrylate (PMMA) resin, a polypropylene resin, a polycarbonate resin, and a polyvinyl chloride resin.

According to the present technology, a structure in which the sum of the grating vectors of the optical elements becomes zero with respect to the reproduction reference light used at the time of reproduction can be produced in a self-forming manner. As a result, the present technology can realize excellent optical characteristics capable of reducing luminance unevenness, color unevenness, and the like without image quality degradation due to grating vector misalignment. Furthermore, according to the present technology, there is no process of aligning the grating vectors, and thus a manufacturing takt time can be shortened as compared with the prior art, and both high quality and low cost can be realized.

Note that the present technology may be applied not only to the biaxial light guide system but also to a uniaxial light guide system. In a case where the present technology is applied to the uniaxial light guide system, the first optical element, the input optical element, and the output optical element can be used in the optical device according to the present technology.

Next, specific embodiments for carrying out the present technology will be described in detail with reference to the drawings. First to eighth embodiments described below are examples of a representative embodiment of the present technology, and the scope of the present technology is not narrowly interpreted by these embodiments.

2. First Embodiment (Example 1 of Optical Device and Example of Method for Manufacturing Optical Device)

An optical device and a method for manufacturing the optical device according to a first embodiment (Example 1 of the optical device and an example of the method for manufacturing the optical device) according to the present technology will be described with reference to FIGS. 1, 2, 3, 4, 5, 6A, 6B, 7A, 7B, 8A, 8B, 8C, 9, 10A, 10B, 10C, 11A, 11B, 11C, 12, 13A, 13B, 13C, 14, 15A, 15B, 15C, 16, 17A, 17B, 18A, 18B, 19, 20A, 20B, 20C, 21, 22A, 22B, 23A, 23B, 24A, 24B, 25A, 25B, 26, 27A, 27B, 27C, and 28.

First, a configuration of the optical device according to the first embodiment of the present technology will be described with reference to FIG. 1. FIG. 1 is a plan view (a planar layout view, a view (x-y plan view) of an x-axis direction and a y-axis direction) of an optical device 100 according to the first embodiment of the present technology.

The optical device 100 includes a light guide plate 1 which totally reflects and guides incident light, a first optical element 5 which is disposed on the light guide plate 1, an input optical element 2 which is disposed on the light guide plate 1 and introduces the incident light into the light guide plate 1, a second optical element 3 which is disposed on the light guide plate 1 and bends light propagated, by total reflection, in the light guide plate 1 in a direction different from a direction of the light, and an output optical element 4 which is disposed on the light guide plate 1 and emits light propagated, by total reflection, in the light guide plate 1 to the outside of the light guide plate 1. In the optical device 100, the first optical element 5 has substantially the same grating vector as the grating vector of the input optical element 2. Then, the first optical element 5 and the input optical element 2 are disposed to face each other with the second optical element 3 interposed therebetween.

Figure 2:
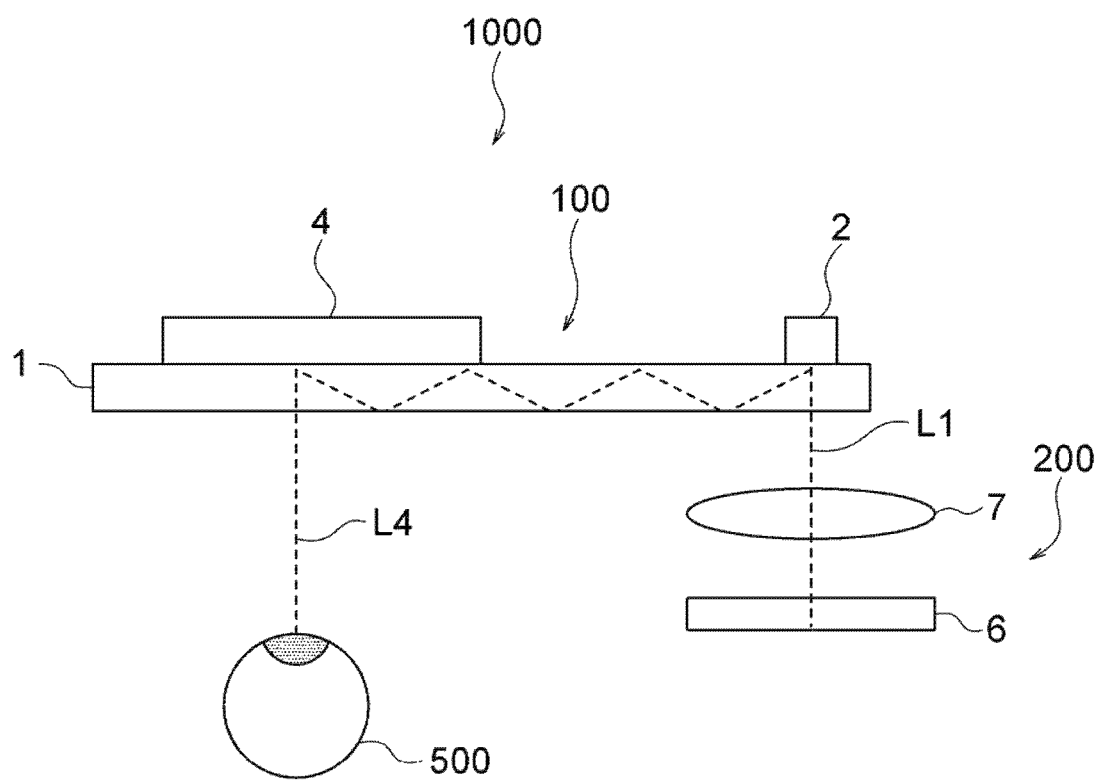
FIG. 2 is a diagram illustrating a configuration example of an image display device (reproduction optical system) of an eighth embodiment including the optical device of the first embodiment to which the present technology is applied.
Figure 3:
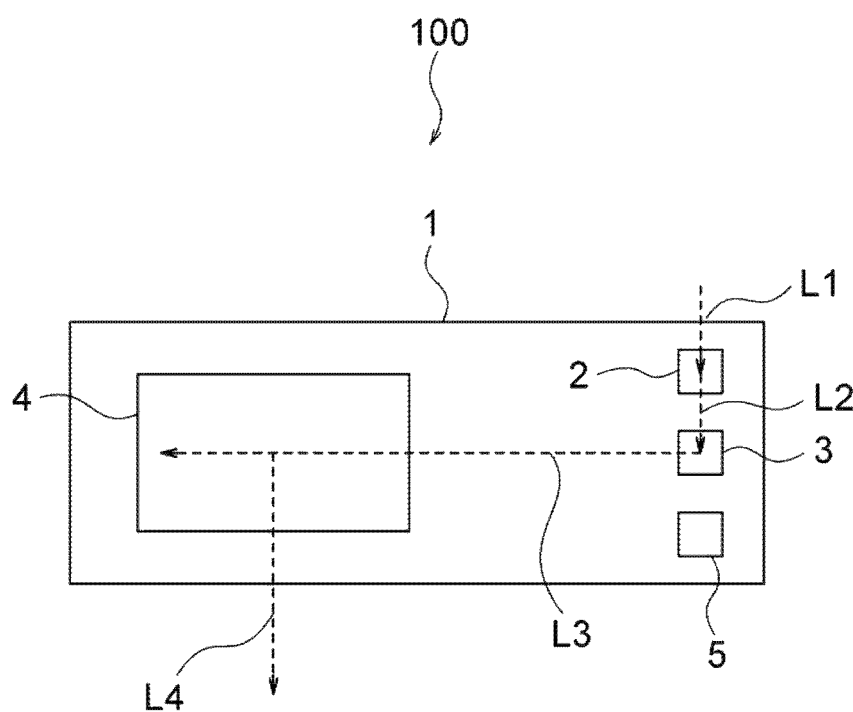
FIG. 3 is a diagram for explaining that light (light beam) emitted from an image forming apparatus (light source) is incident on a light source device of the first embodiment to which the present technology is applied, is guided in the light source device, and is emitted to the outside of the light source device.

The image display device (reproduction optical system) will be described with reference to FIGS. 2 to 4. Note that details of the configuration of the image display device (reproduction optical system) will be described in the section of the eighth embodiment (an example of the image display device) according to the present technology described later. FIG. 2 is a diagram illustrating an image display device (reproduction optical system) 1000 including the optical device 100 according to the first embodiment of the present technology. FIG. 3 is a diagram for explaining that light (light beam) emitted from an image forming apparatus (light source) is incident on a light source device 100, is guided in the light source device 100, and is emitted to the outside of the light source device 100.

As illustrated in FIG. 2, the image display device 1000 includes an image forming apparatus 200 and the optical device 100. The image forming apparatus 200 includes at least a light source 6 and a projection optical system 7.

The description will be given with reference to FIG. 3. The light beam emitted from the light source 6 is shaped by the projection optical system 7 and then is incident, as reproduction reference light L1, on the input optical element 2. In the input optical element 2, diffracted light L2 is generated toward the inside of the light guide plate 1. The diffracted light L2 is incident on the second optical element 3 while being totally reflected in the light guide plate 1. In the second optical element 3, diffraction occurs toward the output optical element 4, and enlarged light L3 is emitted. The enlarged light L3 is guided while being totally reflected in the light guide plate 1, and is incident on the output optical element 4. The light is diffracted out of the medium by the output optical element 4, and reproduction light L4 is obtained. The reproduction light L4 reaches a pupil (eyeball) 500 of an observer.

Figure 4:
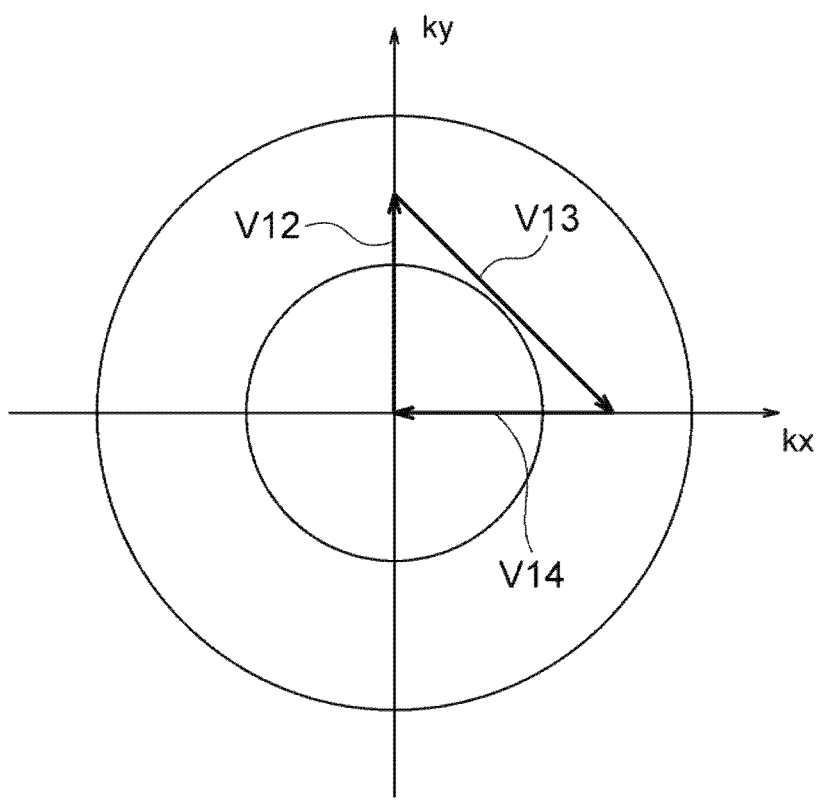
FIG. 4 is a diagram illustrating a grating vector formed in the image display device (reproduction optical system) of the eighth embodiment illustrated in FIGS. 2 and 3.

FIG. 4 is a diagram illustrating a grating vector formed in the image display device (reproduction optical system) 1000. FIG. 4 is a kxky coordinate system represented by two coordinate axes of a kx axis (the horizontal direction in FIG. 4) and a ky axis (the vertical direction in FIG. 4). A grating vector (k vector$_{input}$) V12 is in a +y direction with the origin (the intersection of the kx axis and the ky axis) as a start point, a grating vector (k vector intermediate) V13 is in a +x-y direction with the end point of the grating vector (k vector$_{input}$) V12 as a start point, and a grating vector (k vector$_{output}$) V14 is in the a −x direction with the end point of the grating vector (k vector intermediate) V13 as a start point and the origin as an end point. That is, a triangle is formed by the grating vector (k vector$_{input}$) V12, the grating vector (k vector$_{intermediate}$) V13, and the grating vector (k vector$_{output}$) V14, and starts from the origin and returns to the origin, and the grating vectors are closed. Therefore, the reproduction light L4 having a substantially opposite vector to the reproduction reference light L1 incident on the light guide plate 1 is obtained.

Then, the following equation is established among the grating vector (k vector$_{input}$) V12, the grating vector (k vector$_{intermediate}$) V13, and the grating vector (k vector$_{output}$) V14.

$$\text{grating vector}(k\ \text{vector}_{input})V12 + \text{grating vector}(k\ \text{vector}_{intermediate})V13 + \text{grating vector}(k\ \text{vector}_{output})V14 = 0 \qquad (1)$$

The function of the input optical element 2 included in the optical device 100 will be described in detail with reference to FIGS. 5, 6A, 6B, 7A, 7B, 8A, 8B, and 8C.

Figure 5:
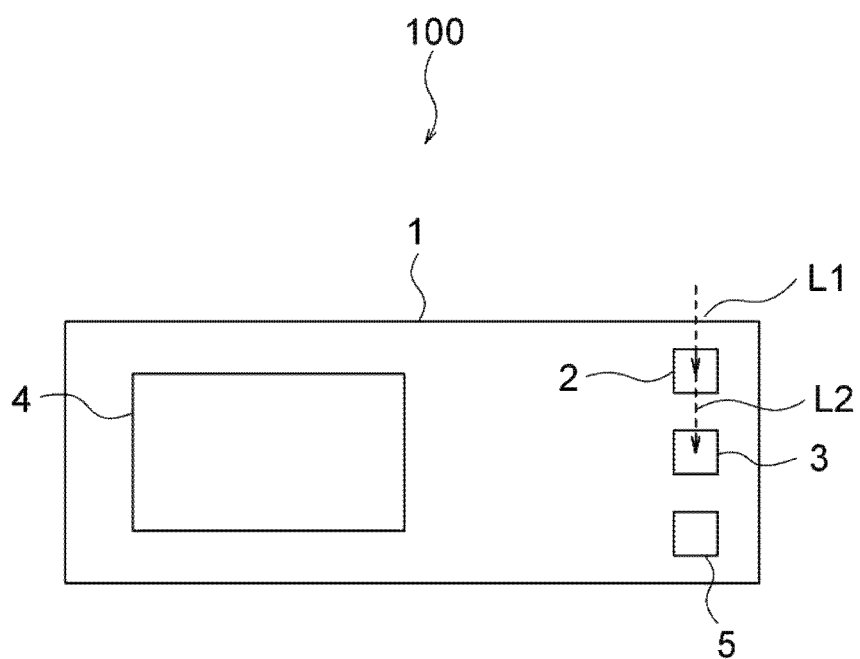
FIG. 5 is a diagram illustrating an example of an optical path of an input optical element included in the optical device of the first embodiment to which the present technology is applied.

FIG. 5 is a plan view (a planar layout view, a view (x-y plan view) of the x-axis direction and the y-axis direction)

illustrating an optical path of the input optical element 2 included in the optical device 100.

Figure 6A:
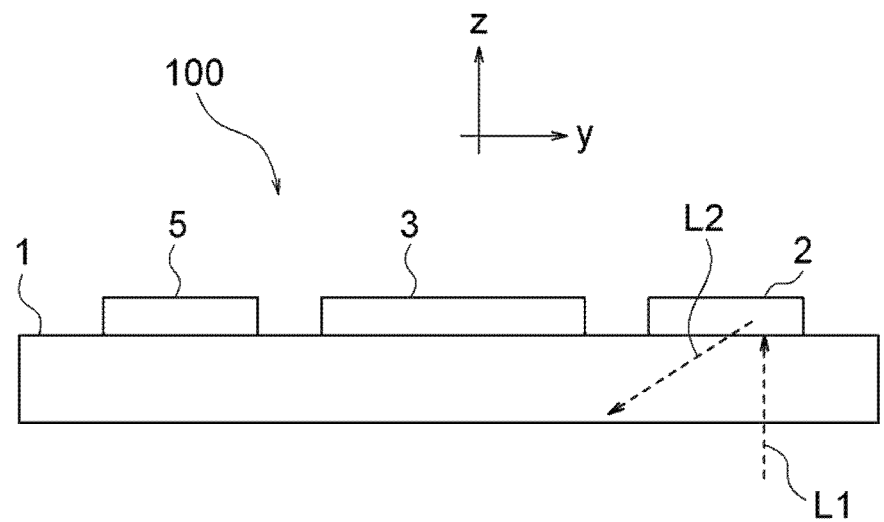
FIG. 6A is a diagram illustrating an example of the optical path of the input optical element included in the optical device of the first embodiment to which the present technology is applied.
Figure 6B:
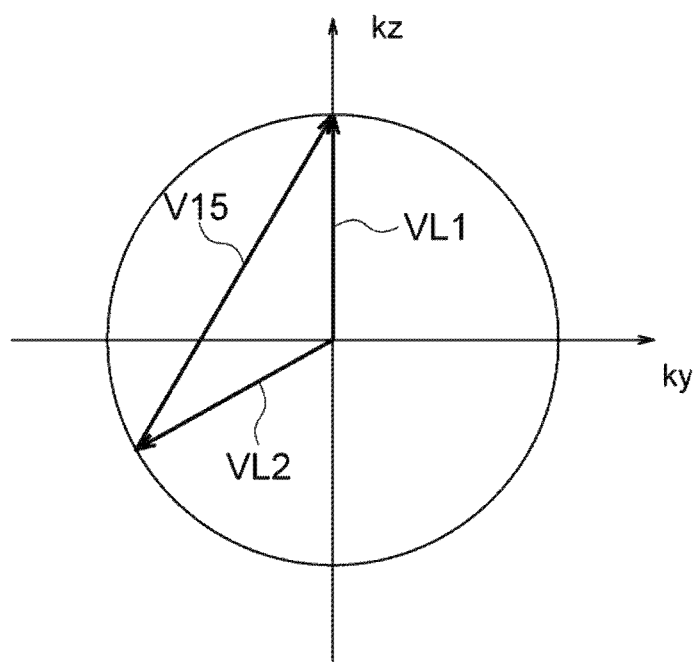
FIG. 6B is a vector diagram of the optical path of the input optical element illustrated in FIG. 6A.

FIG. 6A is a cross-sectional view (a view (y-z plan view) of the y-axis direction and a z-axis direction) illustrating an optical path-1 of the input optical element 2 included in the optical device 100. FIG. 6B is a vector diagram of the optical path-1 of the input optical element 2 illustrated in FIG. 6A. FIG. 6B is a kykz coordinate system represented by two coordinate axes of the ky axis (the horizontal direction in FIG. 6B and a kz axis (the vertical direction in FIG. 6B).

Figure 7A:
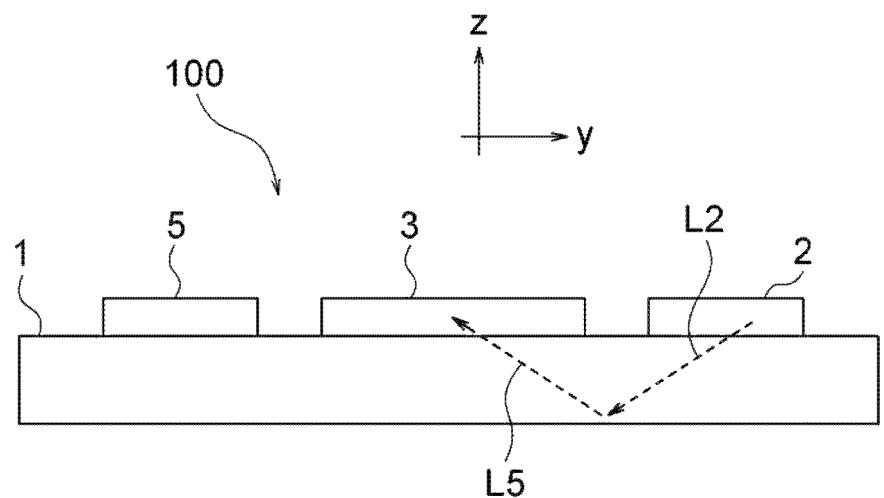
FIG. 7A is a diagram illustrating an example of the optical path of the input optical element included in the optical device of the first embodiment to which the present technology is applied.
Figure 7B:
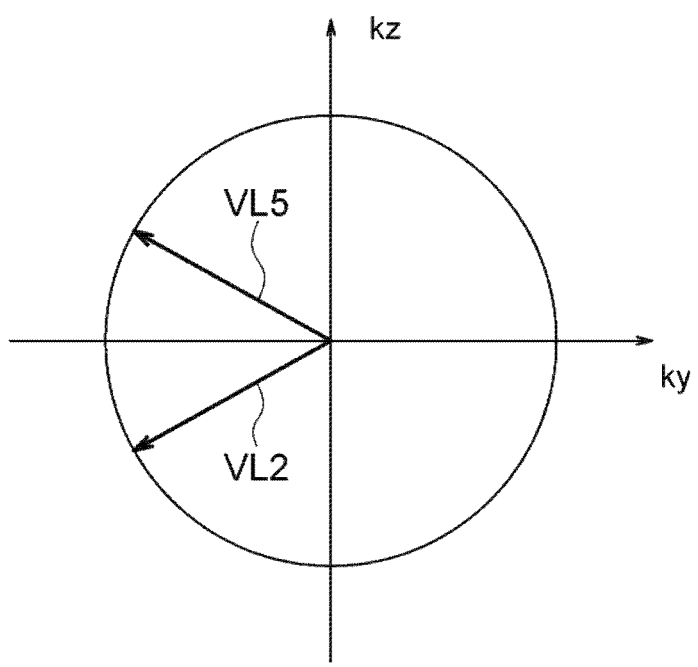
FIG. 7B is a vector diagram of the optical path of the input optical element illustrated in FIG. 7A.

FIG. 7A is a cross-sectional view (a view (y-z plan view) of the y-axis direction and the z-axis direction) illustrating an optical path-2 of the input optical element 2 included in the optical device 100. FIG. 7B is a vector diagram of the optical path-2 of the input optical element 2 illustrated in FIG. 7A. FIG. 7B is the kykz coordinate system represented by two coordinate axes of the ky axis (the horizontal direction in FIG. 7B) and the kz axis (the vertical direction in FIG. 7B).

Figure 8A:
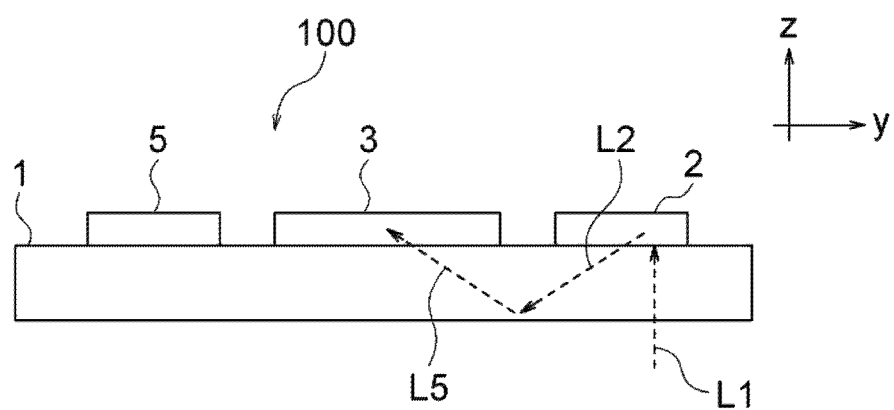
FIG. 8A is a diagram illustrating an example of the optical path of the input optical element included in the optical device of the first embodiment to which the present technology is applied.
Figure 8B:
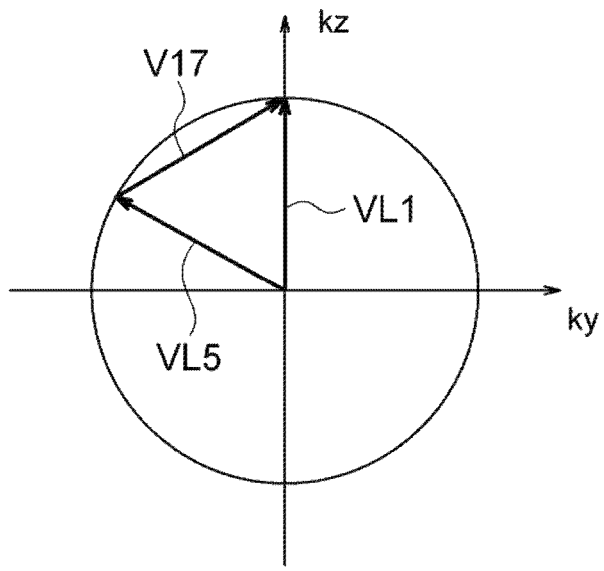
FIG. 8B is a vector diagram of the optical path of the input optical element illustrated in FIG. 8A.
Figure 8C:
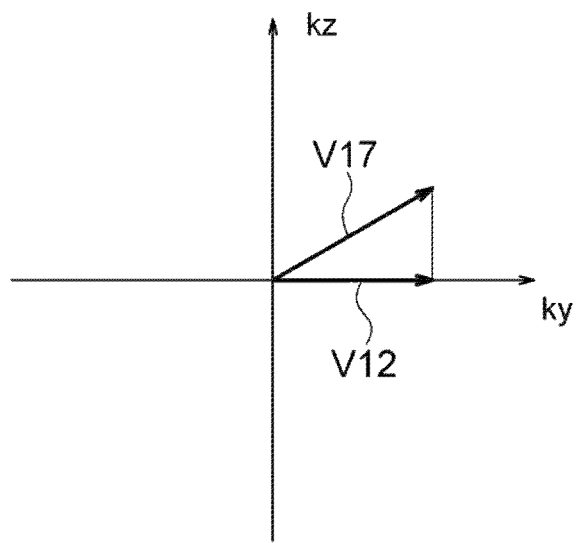
FIG. 8C is a vector diagram of the optical path of the input optical element illustrated in FIG. 8A.

FIG. 8A is a cross-sectional view (a view (y-z plan view) of the y-axis direction and the z-axis direction) illustrating an optical path-12 obtained by combining the optical path-1 and the optical path-2 of the input optical element 2 included in the optical device 100. FIG. 8B is a vector diagram of the optical path-12 of the input optical element 2 illustrated in FIG. 8A. FIG. 8B is the kykz coordinate system represented by two coordinate axes of the ky axis (the horizontal direction in FIG. 8B) and the kz axis (the vertical direction in FIG. 8B). FIG. 8C is a vector diagram (grating vector diagram) of the optical path-12 of the input optical element 2 illustrated in FIG. 8A. FIG. 8C is the kykz coordinate system represented by two coordinate axes of the ky axis (the horizontal direction in FIG. 8C) and the kz axis (the vertical direction in FIG. 8C).

As illustrated in FIGS. 6A, 7A, 8A, 8B, and 8C, in order from the left side in FIGS. 6A, 7A, 8A, 8B, and 8C, the first optical element 5 is disposed on the light guide plate 1 (which is a surface in the x-axis direction and the y-axis direction and is the upper surface in FIGS. 6A, 7A, 8A, 8B, and 8C), the second optical element 3 is disposed on the light guide plate 1 (which is a surface in the x-axis direction and the y-axis direction and is the upper surface in FIGS. 6A, 7A, 8A, 8B, and 8C), and the input optical element 2 is disposed on the light guide plate 1 (which is a surface in the x-axis direction and the y-axis direction and is the upper surface in FIGS. 6A, 7A, 8A, 8B, and 8C).

When the reproduction reference light L1 is incident on the input optical element 5, the diffracted light L2 is generated. A grating vector V15 (here, a k vector'input) can be expressed by a relationship between a vector VL1 of the reproduction reference light L1 and a vector VL2 of the diffracted light L2, and is illustrated in FIG. 6B.

The diffracted light L2 is totally reflected in the light guide plate 1, and reflected light L5 which is the reflected light is incident on the second optical element 3. As illustrated in FIG. 7B, wavevector components in the x and y directions do not change in the total reflection. As illustrated in FIG. 8B, a grating vector V17 (represented by a k vector"input) can be expressed by a relationship between the vector VL1 of the reproduction reference light L1 and the vector VL5 of the reflected light L5. As illustrated in FIG. 8C, the grating vector (k vector input) V12 and the grating vector V17 (represented by the k vector"input) are different in magnitude in a kz-axis direction, but in the kx axis-ky axis (in a kx-ky plane), the grating vector (k vector input) V12 and the grating vector V17 (represented by the k vector"input) coincide with each other.

The function of the second optical element 3 included in the optical device 100 will be described in detail with reference to FIGS. 9, 10A, 10B, 10C, 11A, 11B, 11C, 12, 13A, 13B, and 13C.

Figure 9:
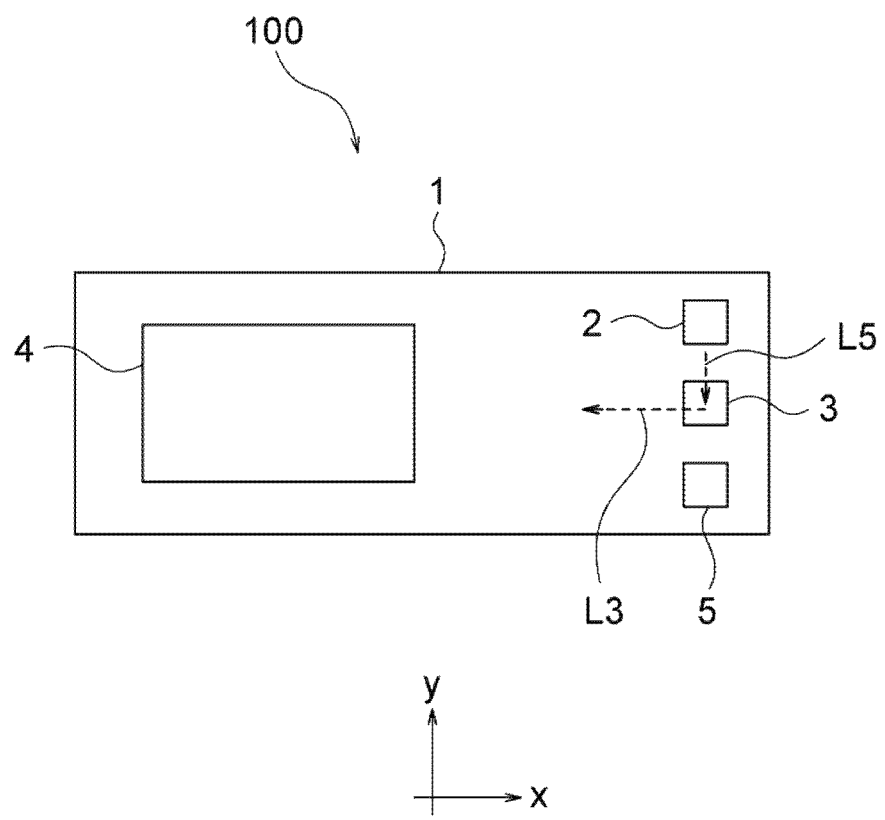
FIG. 9 is a diagram illustrating an example of an optical path of a second optical element included in the optical device of the first embodiment to which the present technology is applied.

FIG. 9 is a plan view (a planar layout view, a view (x-y plan view) of the x-axis direction and the y-axis direction) illustrating an optical path of the second optical element 3 included in the optical device 100.

Figure 10A:
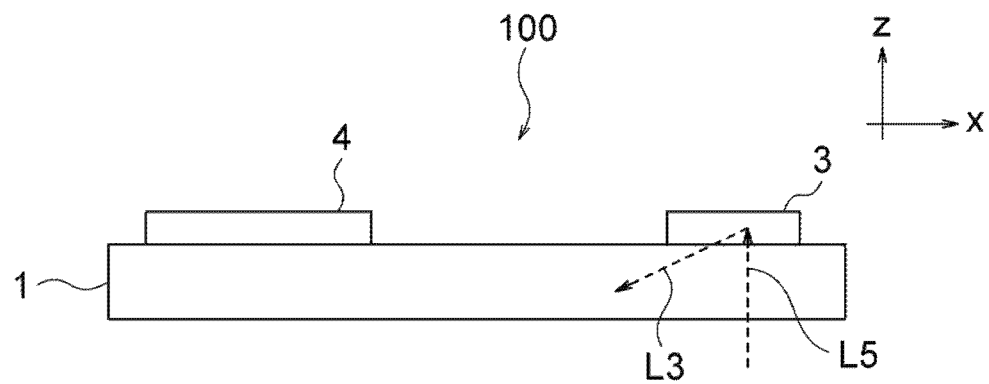
FIG. 10A is a diagram illustrating an example of the optical path of the second optical element included in the optical device of the first embodiment to which the present technology is applied.
Figure 10B:
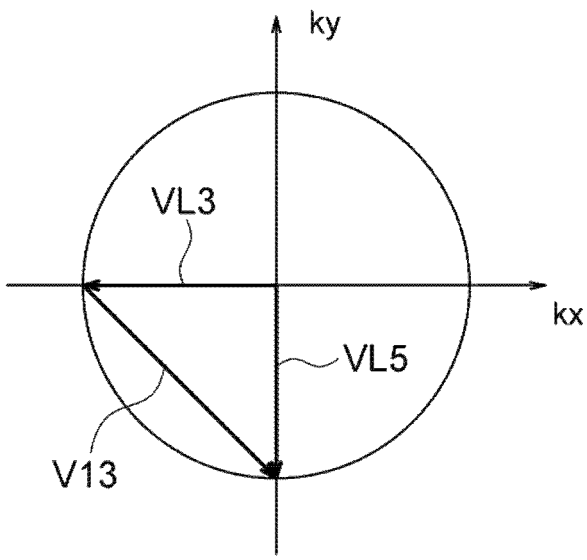
FIG. 10B is a vector diagram of the optical path of the second optical element illustrated in FIG. 10A.
Figure 10C:
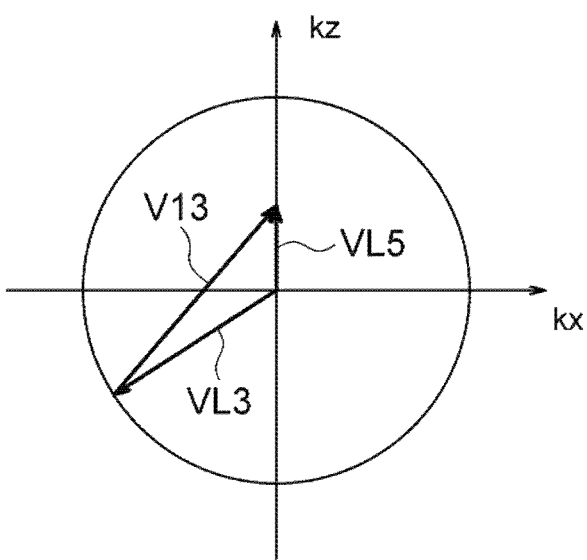
FIG. 10C is a vector diagram of the optical path of the second optical element illustrated in FIG. 10A.

FIG. 10A is a cross-sectional view (a view (x-z plan view) of the x-axis direction and the z-axis direction) illustrating an optical path-3 of the second optical element 3 included in the optical device 100. FIG. 10B is a vector diagram of the optical path-3 of the second optical element 3 illustrated in FIG. 10A. FIG. 10B is the kxky coordinate system represented by two coordinate axes of the x axis (the horizontal direction in FIG. 10B) and the ky axis (the vertical direction in FIG. 10B). FIG. 10C is a vector diagram of the optical path-3 of the second optical element 3 illustrated in FIG. 10A. FIG. 10C is a kxkz coordinate system represented by two coordinate axes of the x axis (the horizontal direction in FIG. 10C) and the kz axis (the vertical direction in FIG. 10C).

Figure 11A:
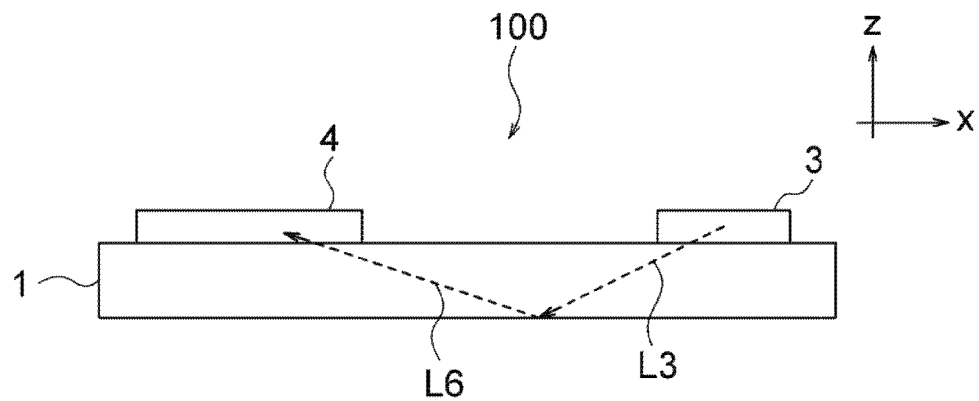
FIG. 11A is a diagram illustrating an example of the optical path of the second optical element included in the optical device of the first embodiment to which the present technology is applied.
Figure 11B:
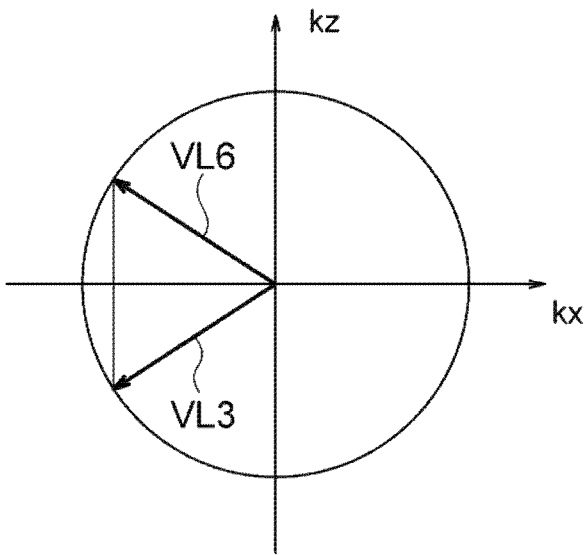
FIG. 11B is a vector diagram of the optical path of the second optical element illustrated in FIG. 11A.
Figure 11C:
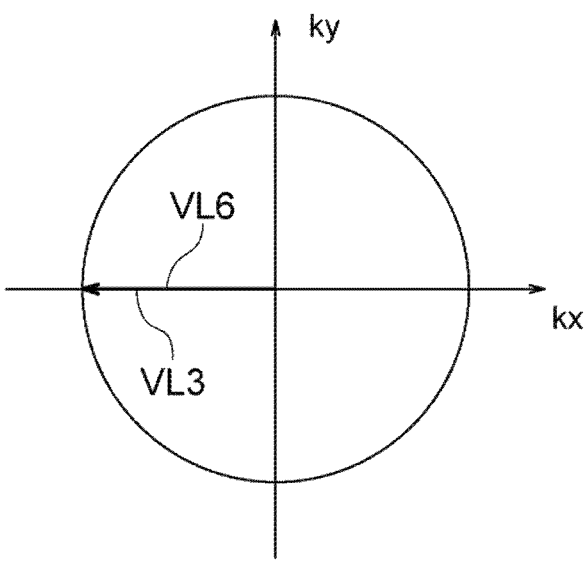
FIG. 11C is a vector diagram of the optical path of the second optical element illustrated in FIG. 11A.

FIG. 11A is a cross-sectional view (a view (x-z plan view) of the x-axis direction and the z-axis direction) illustrating an optical path-4 of the second optical element 3 included in the optical device 100. FIG. 10B is a vector diagram of the optical path-4 of the second optical element 3 illustrated in FIG. 10A. FIG. 11B is the kxkz coordinate system represented by two coordinate axes of the kx axis (the horizontal direction in FIG. 11B) and the kz axis (the vertical direction in FIG. 11B). FIG. 11C is a vector diagram of the optical path-4 of the second optical element 3 illustrated in FIG. 11A. FIG. 11C is the kxky coordinate system represented by two coordinate axes of the kx axis (the horizontal direction in FIG. 11C) and the ky axis (the vertical direction in FIG. 10C).

Figure 12:
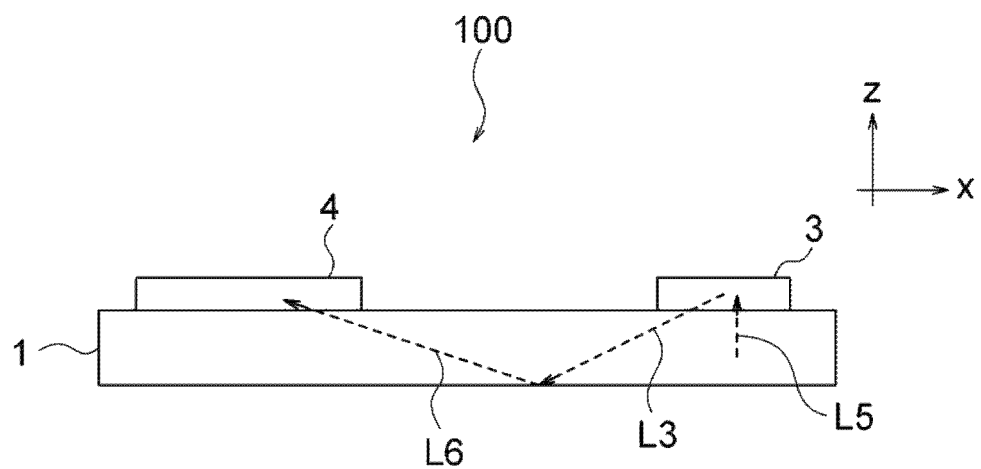
FIG. 12 is a diagram illustrating an example of the optical path of the second optical element included in the optical device of the first embodiment to which the present technology is applied.

FIG. 12 is a cross-sectional view (a view (x-z plan view) of the x-axis direction and the z-axis direction) illustrating an optical path-34 obtained by combining the optical path-3 and the optical path-4 of the second optical element 3 included in the optical device 100.

Figure 13A:
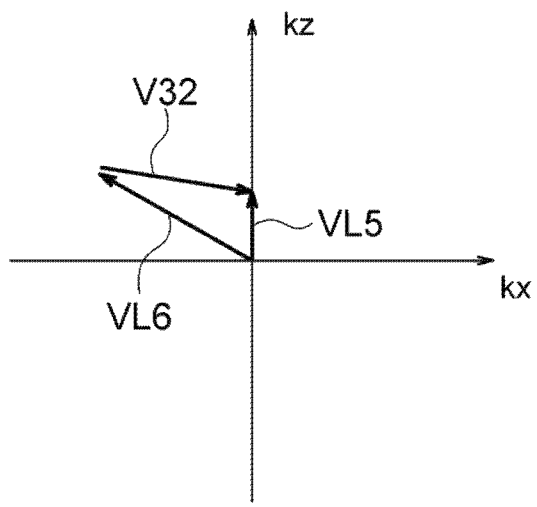
FIG. 13A is a vector diagram of the optical path of the second optical element illustrated in FIG. 12.
Figure 13B:
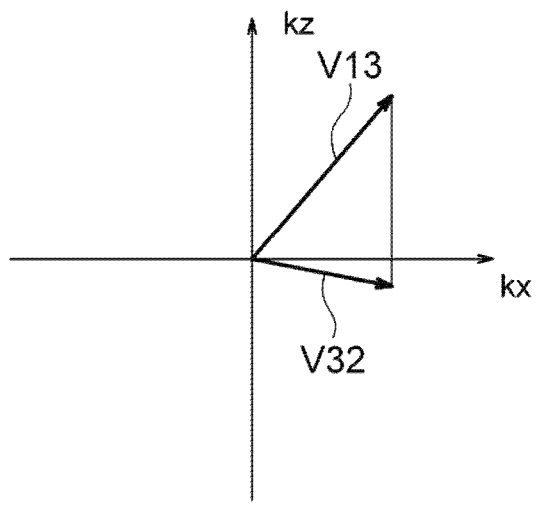
FIG. 13B is a vector diagram of the optical path of the second optical element illustrated in FIG. 12.
Figure 13C:
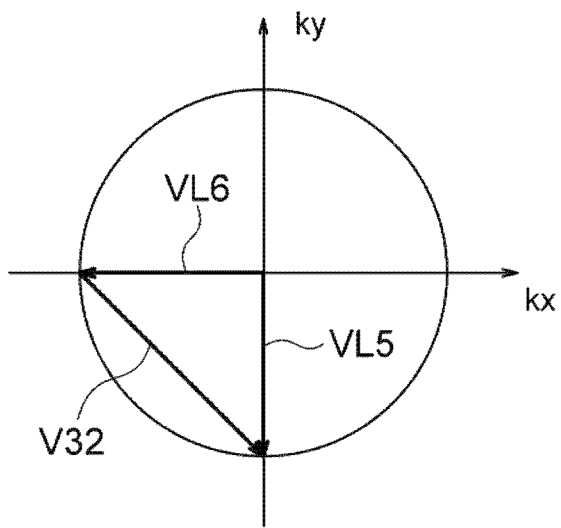
FIG. 13C is a vector diagram of the optical path of the second optical element illustrated in FIG. 12.

FIG. 13A is a vector diagram of the optical path-34 of the second optical element 3 illustrated in FIG. 12. FIG. 13A is the kxkz coordinate system represented by two coordinate axes of the kx axis (the horizontal direction in FIG. 13A) and the kz axis (the vertical direction in FIG. 13A). FIG. 13B is a vector diagram (grating vector diagram) of the optical path-34 of the second optical element 2 illustrated in FIG. 12. FIG. 13B is the kxkz coordinate system represented by two coordinate axes of the kx axis (the horizontal direction in FIG. 13B) and the kz axis (the vertical direction in FIG. 13B). FIG. 13C is a vector diagram of the optical path-34 of the second optical element 2 illustrated in FIG. 12. FIG. 13C is the kxky coordinate system represented by two coordinate axes of the kx axis (the horizontal direction in FIG. 13C) and the ky axis (the vertical direction in FIG. 13C).

As illustrated in FIGS. 10A, 11A, and 12, in order from the left side in FIGS. 10A, 11A, and 12, the output optical element 4 is disposed on the light guide plate 1 (which is a surface in the x-axis direction and the y-axis direction and is the upper surface in FIGS. 10A, 11A, and 12), and the second optical element 3 is disposed on the light guide plate 1 (which is a surface in the x-axis direction and the y-axis direction and is the upper surface in FIGS. 10A, 11A, and 12)

When the reflected light L5 is incident (incident from the back side of the paper in FIG. 10A) on the second optical element 3, the enlarged light L3 is generated as illustrated in FIG. 10A. As illustrated in FIG. 10B, the grating vector V13 (k vector intermediate) can be expressed by a relationship between the vector VL5 of the reflected light L5 and the enlarged light VL3.

As illustrated in FIG. 11A, similarly to the case of the input optical element 2 described above, propagation is performed with total reflection, but the magnitudes of the kx and ky components of the vector VL3 of the enlarged light L3 and the vector VL6 of the reflected light L6 do not change (FIGS. 11B and 11C).

The vectors from the reflected light L5 incident on the second optical element 3 to the incidence on the output optical element 4 are combined as illustrated in FIGS. 12, 13A, 13B, and 13C. As illustrated in FIG. 13A, a grating vector V32 (referred to as k vector'intermediate) can be expressed by the vector VL5 of the reflected light L5 and the vector VL6 of the reflected light L6. As illustrated in FIGS. 4, 13B, and 13C, the grating vector V13 (k vector intermediate) and the grating vector V32 (referred to as k vecto-r'intermediate) coincide with each other in the kx and ky components.

The function of the output optical element 4 included in the optical device 100 will be described in detail with reference to FIGS. 14, 15A, 15B, and 15C.

Figure 14:
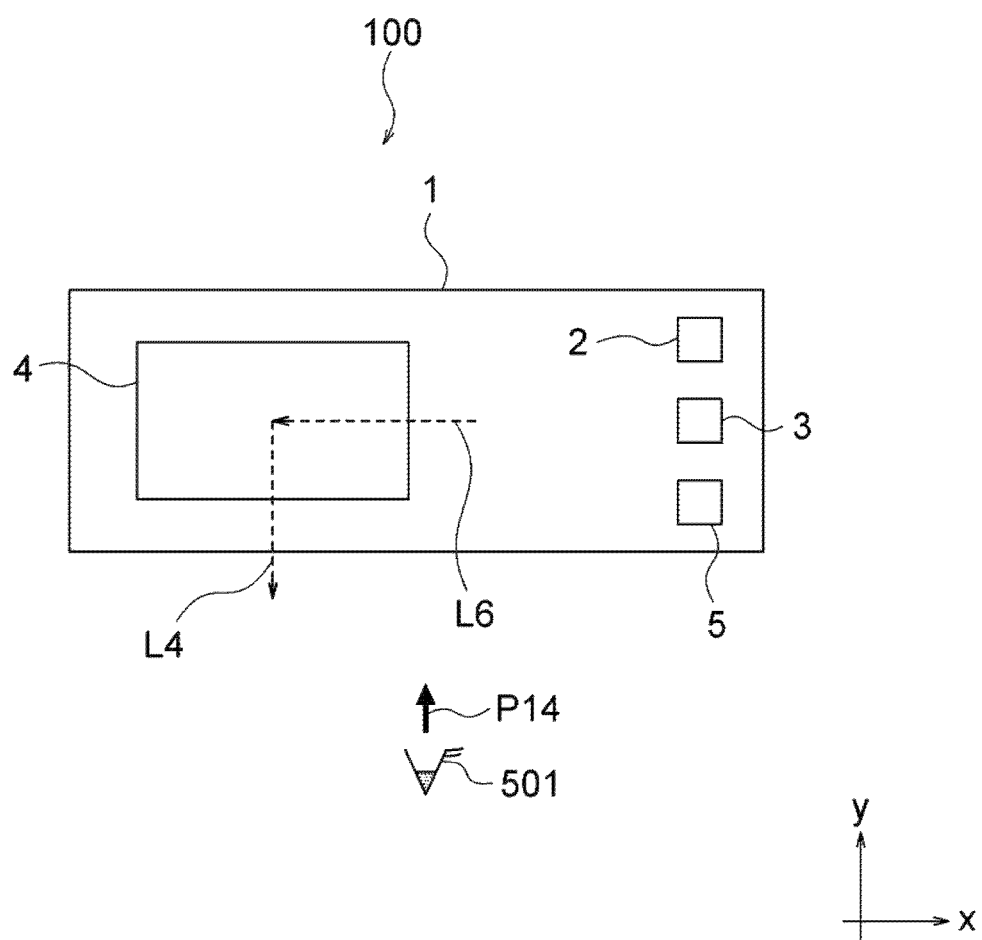
FIG. 14 is a diagram illustrating an example of an optical path of an output optical element included in the optical device of the first embodiment to which the present technology is applied.

FIG. 14 is a plan view (a planar layout view, a view (x-y plan view) of the x-axis direction and the y-axis direction) illustrating an optical path of the output optical element 4 included in the optical device 100.

Figure 15A:
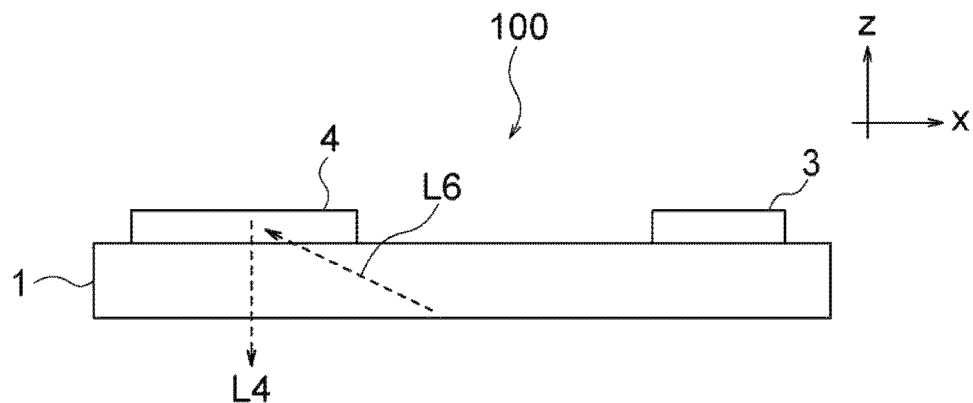
FIG. 15A is a diagram illustrating an example of the optical path of the output optical element included in the optical device of the first embodiment to which the present technology is applied.
Figure 15B:
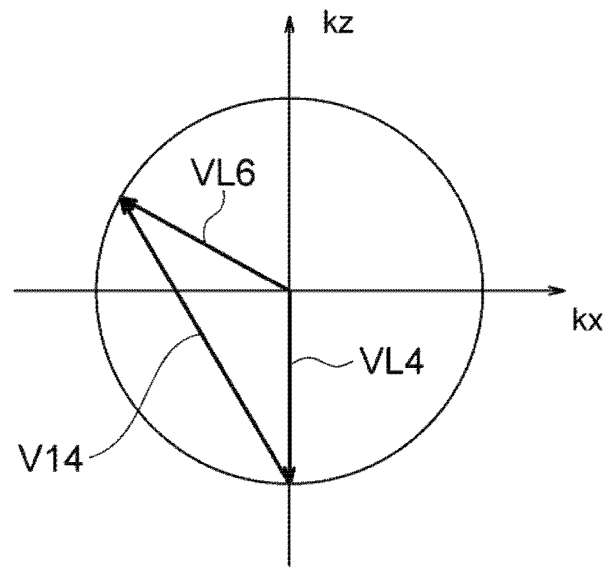
FIG. 15B is a vector diagram of the optical path of the output optical element illustrated in FIG. 15A.
Figure 15C:
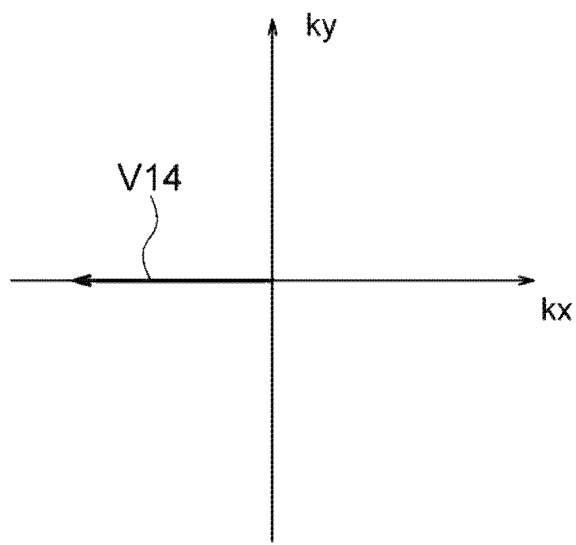
FIG. 15C is a vector diagram of the optical path of the output optical element illustrated in FIG. 15A.

FIG. 15A is a cross-sectional view (a view (x-z plan view) of the x-axis direction and the z-axis direction) illustrating an optical path-5 of the output optical element 4 included in the optical device 100 when observed in the direction of an arrow P14 by the observer's eyes 501 illustrated in FIG. 14. FIG. 15B is a vector diagram of the optical path-5 of the output optical element 4 illustrated in FIG. 15A. FIG. 15B is the kxkz coordinate system represented by two coordinate axes of the kx axis (the horizontal direction in FIG. 15B) and the kz axis (the vertical direction in FIG. 15B). FIG. 15C is a vector diagram (grating vector diagram) of the optical path-5 of the output optical element 4 illustrated in FIG. 15A. FIG. 15C is the kxky coordinate system represented by two coordinate axes of the kx axis (the horizontal direction in FIG. 15C) and the ky axis (the vertical direction in FIG. 15C).

As illustrated in FIG. 15A, in order from the left side in FIG. 15A, the output optical element 4 is disposed on the light guide plate 1 (which is a surface in the x-axis direction and the y-axis direction and is the upper surface in FIG. 15A), and the second optical element 3 is disposed on the light guide plate 1 (which is a surface in the x-axis direction and the y-axis direction and is the upper surface in FIG. 15A).

When the reflected light L6 is incident on the output optical element 4, the reproduction light L4 is generated as illustrated in FIGS. 14 and 15A. As illustrated in FIG. 15B, the grating vector (k vector output) V14 can be expressed by a relationship between the vector VL6 of the reflected light L6 and the vector VL4 of the reproduction light L4. Then, as illustrated in FIG. 15C, the grating vector (k vector output) V14 is in the −x direction with the origin (the intersection of the kx axis and the ky axis) as a start point, and coincides with the grating vector illustrated in FIG. 4.

As described above, the grating vectors of the optical elements (the input optical element 2, the second optical element (intermediate grating) 3, and the output optical element 4) disposed on the light guide plate 1 are closed (the sum is zero) as illustrated in FIG. 4 and has a function of emitting a light beam having a substantially opposite vector to the light beam incident on the light guide plate 1.

Next, a method for manufacturing the optical device according to the first embodiment of the present technology will be described with reference to FIGS. 16, 17A, 17B, 18A, 18B, 19, 20A, 20B, 20C, 21, 22A, 22B, 23A, 23B, 24A, 24B, 25A, 25B, 26, 27A, 27B, 27C, and 28. One of the features of the method for manufacturing the optical device according to the first embodiment of the present technology is to form the grating vector illustrated in FIG. 4 by using the first optical element 5.

First, a production optical path from the output optical element 4 will be described with reference to FIGS. 16, 17A, 17B, 18A, 18B, 19, 20A, 20B, and 20C.

Figure 16:
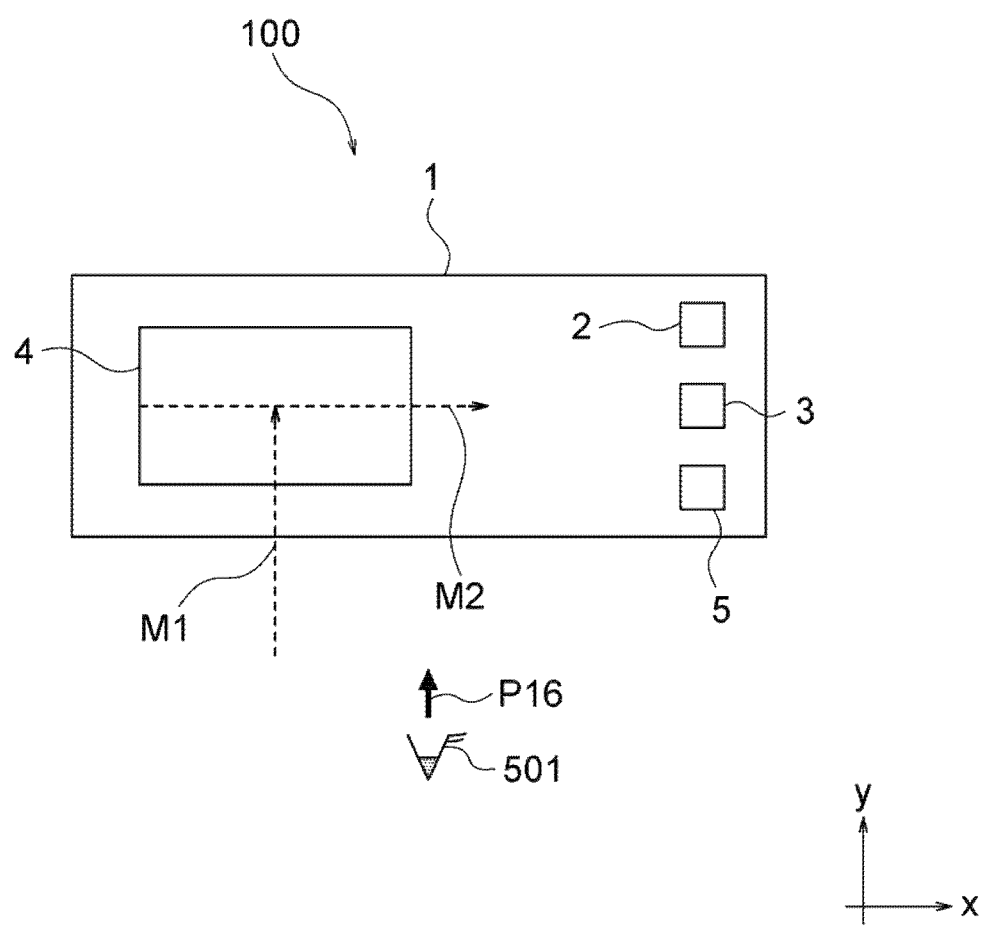
FIG. 16 is a diagram illustrating an example of a production optical path from the output optical element included in the optical device of the first embodiment to which the present technology is applied.

FIG. 16 is a plan view (a planar layout view, a view (x-y plan view) of the x-axis direction and the y-axis direction) illustrating the production optical path from the output optical element 4 included in the optical device 100.

Figure 17A:
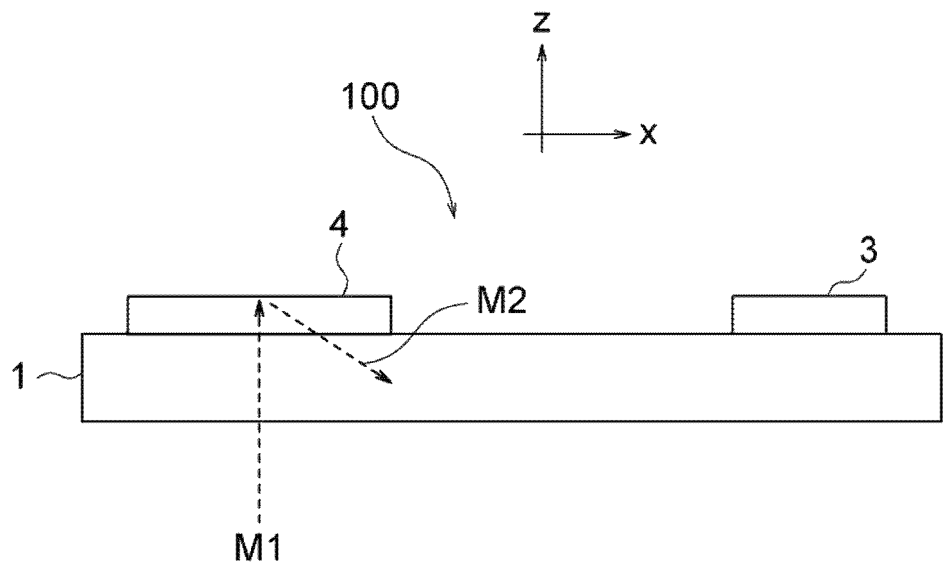
FIG. 17A is a diagram illustrating an example of the production optical path from the output optical element included in the optical device of the first embodiment to which the present technology is applied.
Figure 17B:
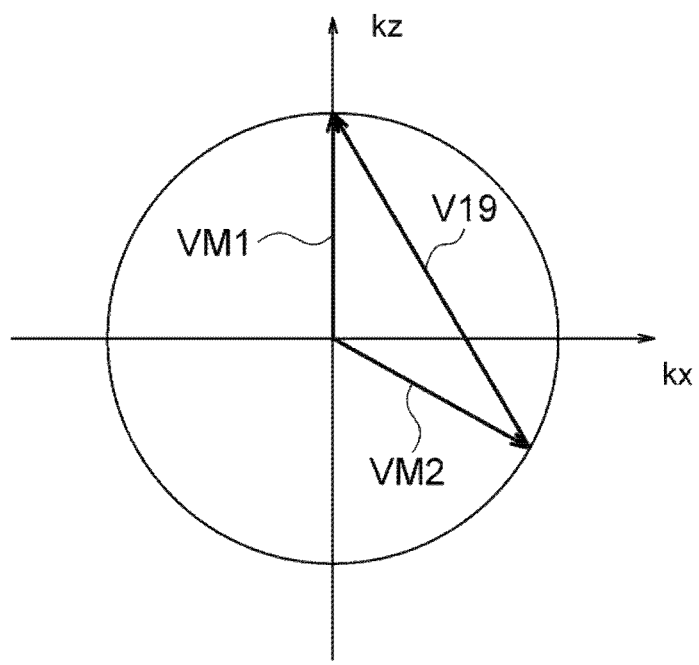
FIG. 17B is a vector diagram of the production optical path from the output optical element illustrated in FIG. 17A.

FIG. 17A is a cross-sectional view (a view (x-z plan view) of the x-axis direction and the z-axis direction) illustrating a production optical path-11 from the output optical element 4 included in the optical device 100 when observed in the direction of an arrow P16 by the observer's eyes 501 illustrated in FIG. 16. FIG. 17B is a vector diagram of the optical path-11 of the output optical element 4 illustrated in FIG. 17A. FIG. 17B is the kxkz coordinate system represented by two coordinate axes of the kx axis (the horizontal direction in FIG. 17B) and the kz axis (the vertical direction in FIG. 17B).

Figure 18A:
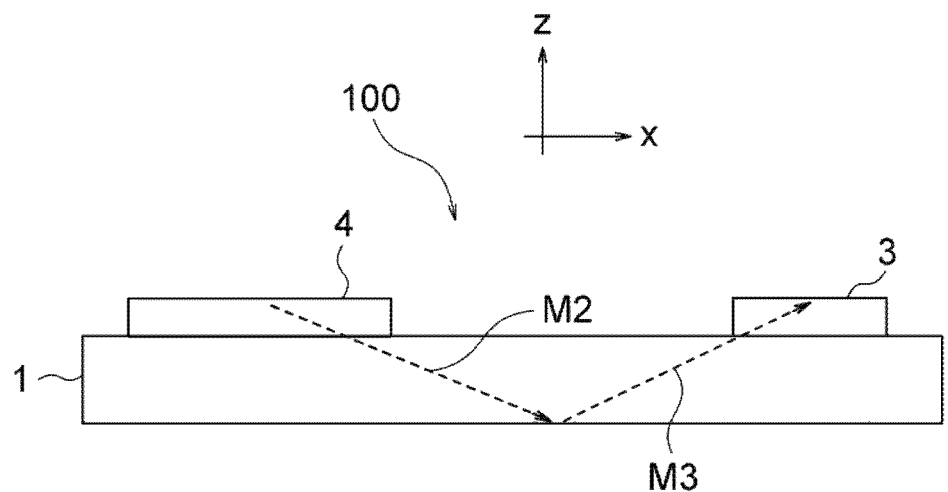
FIG. 18A is a diagram illustrating an example of the production optical path from the output optical element included in the optical device of the first embodiment to which the present technology is applied.
Figure 18B:
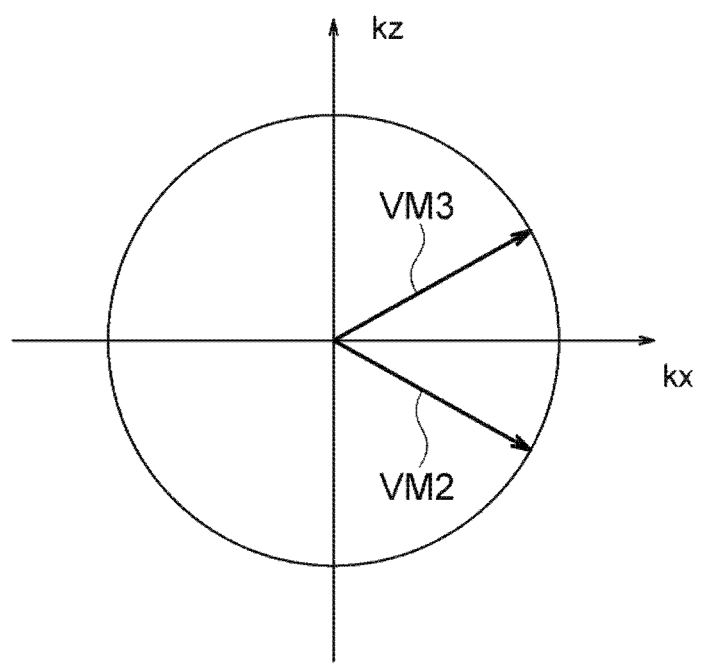
FIG. 18B is a vector diagram of the production optical path from the output optical element illustrated in FIG. 18A.

FIG. 18A is a cross-sectional view (a view (x-z plan view) of the x-axis direction and the z-axis direction) illustrating a production optical path-12 from the output optical element 4 included in the optical device 100 when observed in the direction of the arrow P16 by the observer's eyes 501 illustrated in FIG. 16. FIG. 18B is a vector diagram of the production optical path-12 from the output optical element 4 illustrated in FIG. 18A. FIG. 18B is the kxkz coordinate system represented by two coordinate axes of the kx axis (the horizontal direction in FIG. 18B) and the kz axis (the vertical direction in FIG. 18B).

Figure 19:
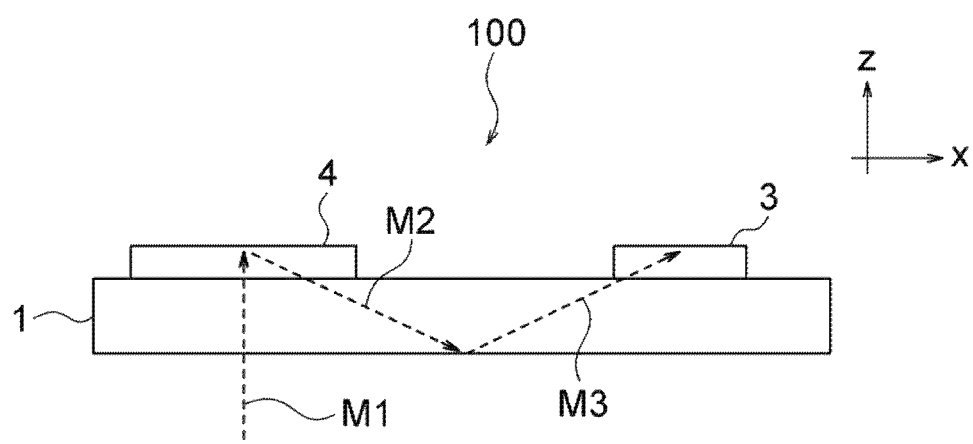
FIG. 19 is a diagram illustrating an example of the production optical path from the output optical element included in the optical device of the first embodiment to which the present technology is applied.

FIG. 19 is a cross-sectional view (a view (x-z plan view) of the x-axis direction and the z-axis direction) illustrating a production optical path-1112 obtained by combining the production optical path-11 and the production optical path-12 from the output optical element 4 included in the optical device 100.

Figure 20A:
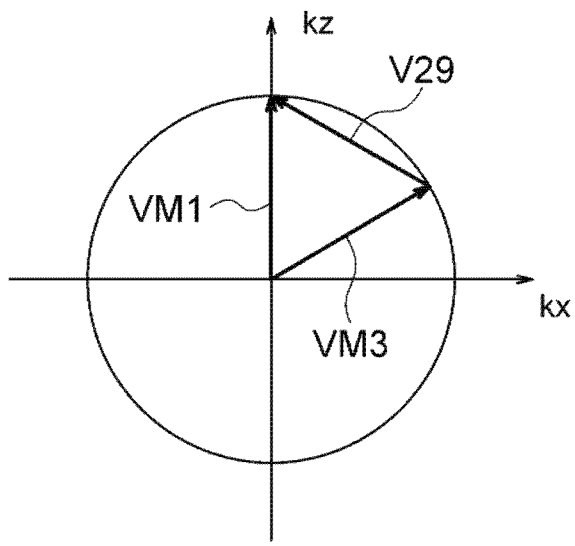
FIG. 20A is a vector diagram of the production optical path from the output optical element illustrated in FIG. 19.
Figure 20B:
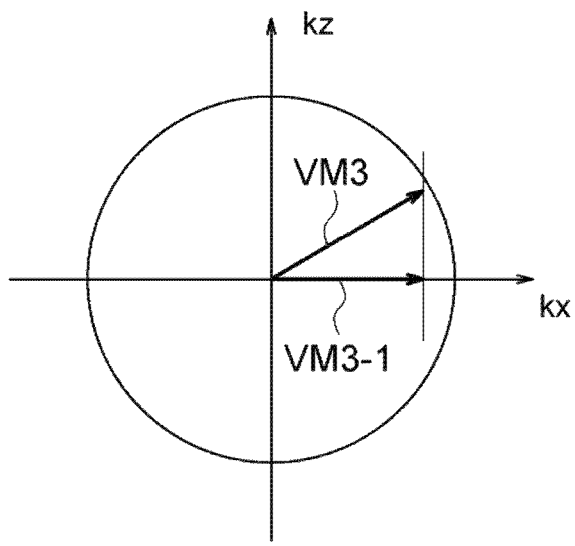
FIG. 20B is a vector diagram of the production optical path from the output optical element illustrated in FIG. 19.
Figure 20C:
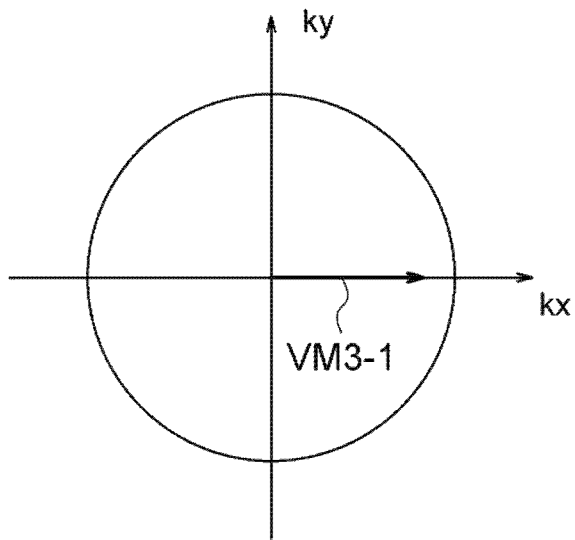
FIG. 20C is a vector diagram of the production optical path from the output optical element illustrated in FIG. 19.

FIG. 20A is a vector diagram of the production optical path-1112 from the output optical element 4 illustrated in FIG. 19. FIG. 20A is the kxkz coordinate system represented by two coordinate axes of the kx axis (the horizontal direction in FIG. 20A) and the kz axis (the vertical direction in FIG. 20A). FIG. 20B is a vector diagram of the production optical path-1112 from the output optical element 4 illustrated in FIG. 19. FIG. 20B is the kxkz coordinate system represented by two coordinate axes of the kx axis (the horizontal direction in FIG. 20B) and the kz axis (the vertical direction in FIG. 20B). FIG. 20C is a vector diagram of the production optical path-1112 from the output optical element 4 illustrated in FIG. 19. FIG. 20C is the kxky coordinate system represented by two coordinate axes of the kx axis (the horizontal direction in FIG. 20C) and the ky axis (the vertical direction in FIG. 20C).

As illustrated in FIGS. 17A, 18A, and 19, in order from the left side in FIGS. 17A, 18A, and 19, the output optical element 4 is disposed on the light guide plate 1 (which is a surface in the x-axis direction and the y-axis direction and is the upper surface in FIGS. 17A, 18A, and 19), and the second optical element 3 is disposed on the light guide plate 1 (which is a surface in the x-axis direction and the y-axis direction and is the upper surface in FIGS. 17A, 18A, and 19).

When object light M1 having a substantially opposite vector to the reproduction light L4 is incident on the output optical element 4, diffracted light M2 is generated as illustrated in FIGS. 16 and 17A.

As illustrated in FIG. 17B, a grating vector (here, k vector'output) V19 can be expressed by a vector VM1 of the object light M1 and a vector VM2 of the diffracted light M2.

As illustrated in FIG. 18A, similarly to the case of the input optical element 2 described above, propagation is performed with total reflection, but the magnitudes of the kx and ky components of the vector VM2 of the diffracted light M2 and a vector VM3 of reflected light M3 do not change (FIG. 11B).

The vectors from the object light M1 incident on the output optical element 4 to the incidence on the second optical element 3 are combined as illustrated in FIG. 19. As illustrated in FIG. 20A, a grating vector (here, k vector"output) V29 can be expressed by the vector VM1 of the object light M1 and the vector VM3 of the reflected light M3. Then, in the grating vector (k vector'output) V19 and the grating vector (k vector"output) V29, the kx components have substantially the same magnitude and substantially the same direction, and in the grating vector (k vector'output) V19 and the grating vector (k vector"output) V29, and the grating vector (k vector output) V14, the kx components have substantially the same magnitude but substantially opposite directions.

When a positive oblique shadow of the vector VM3 of the reflected light M3 incident on the second optical element 3 on the kx axis is set as a vector VM3-1, the vector VM3-1 can be expressed in a kx/ky space (x-y coordinate system) as illustrated in FIG. 20C.

A production optical path from the first optical element 5 will be described with reference to FIGS. 21, 22A, 22B, 23A, 23B, 24A, 24B, 25A, 25B, 26, 27A, 27B, and 27C.

Figure 21:
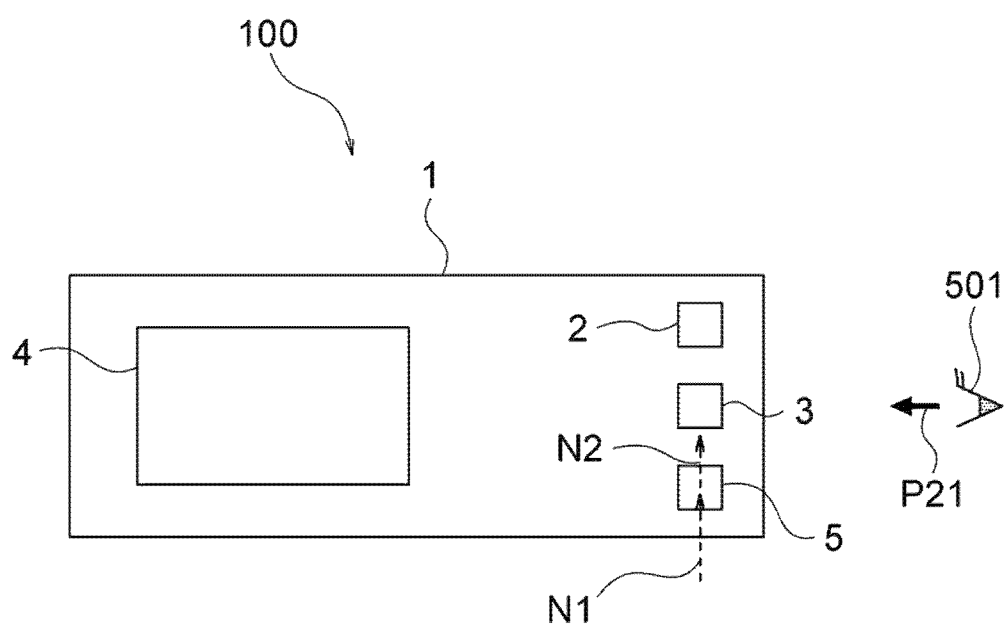
FIG. 21 is a diagram illustrating an example of a production optical path from a first optical element included in the optical device of the first embodiment to which the present technology is applied.

FIG. 21 is a plan view (a planar layout view, a view (x-y plan view) of the x-axis direction and the y-axis direction) illustrating the production optical path from the first optical element 5 included in the optical device 100.

Figure 22A:
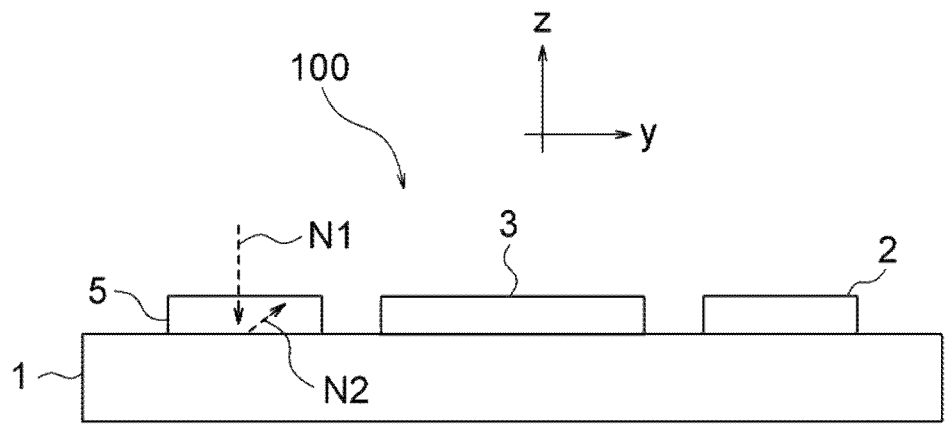
FIG. 22A is a diagram illustrating an example of the production optical path from the first optical element included in the optical device of the first embodiment to which the present technology is applied.
Figure 22B:
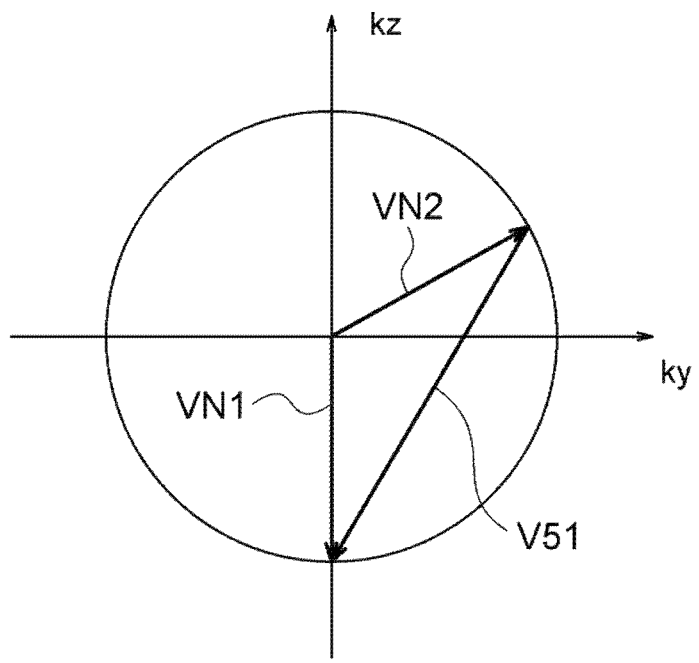
FIG. 22B is a vector diagram of the production optical path from the first optical element illustrated in FIG. 22A.

FIG. 22A is a cross-sectional view (a view (y-z plan view) of the y-axis direction and the z-axis direction) illustrating a production optical path-13 from the first optical element 5 included in the optical device 100 when observed in the direction of an arrow P21 by the observer's eyes 501 illustrated in FIG. 21. FIG. 22B is a vector diagram of the production optical path-13 from the first optical element 5 illustrated in FIG. 22A. FIG. 22B is the kykz coordinate system represented by two coordinate axes of the ky axis (the horizontal direction in FIG. 22B) and the kz axis (the vertical direction in FIG. 22B).

Figure 23A:
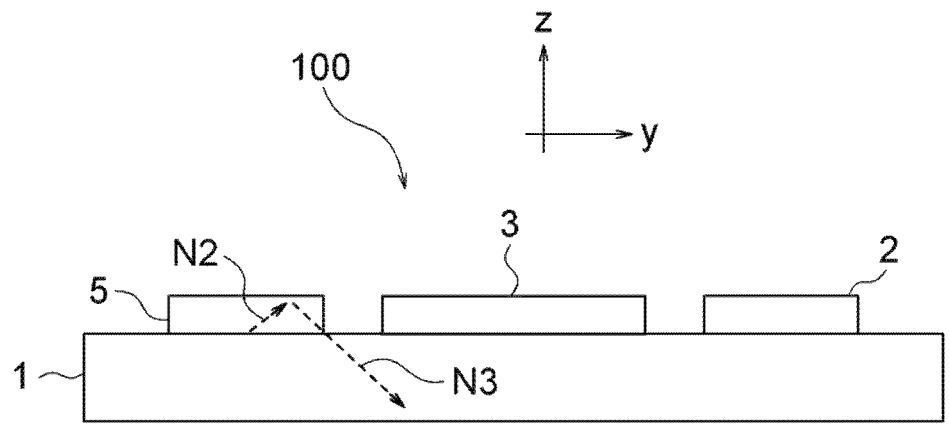
FIG. 23A is a diagram illustrating an example of the production optical path from the first optical element included in the optical device of the first embodiment to which the present technology is applied.
Figure 23B:
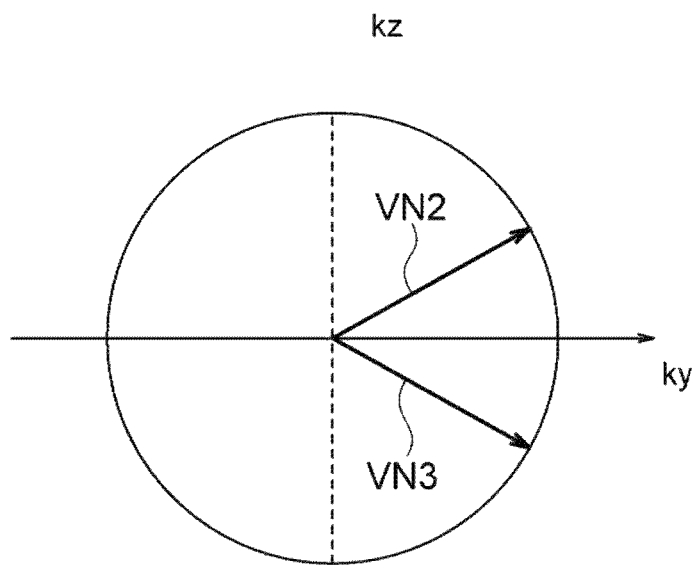
FIG. 23B is a vector diagram of the production optical path from the first optical element illustrated in FIG. 23A.

FIG. 23A is a cross-sectional view (a view (y-z plan view) of the y-axis direction and the z-axis direction) illustrating a production optical path-14 from the first optical element 5 included in the optical device 100 when observed in the direction of the arrow P21 by the observer's eyes 501 illustrated in FIG. 21. FIG. 23B is a vector diagram of the production optical path-14 from the first optical element 5 illustrated in FIG. 23A. FIG. 23B is the kykz coordinate system represented by two coordinate axes of the ky axis (the horizontal direction in FIG. 23B) and the kz axis (the vertical direction in FIG. 23B).

Figure 24A:
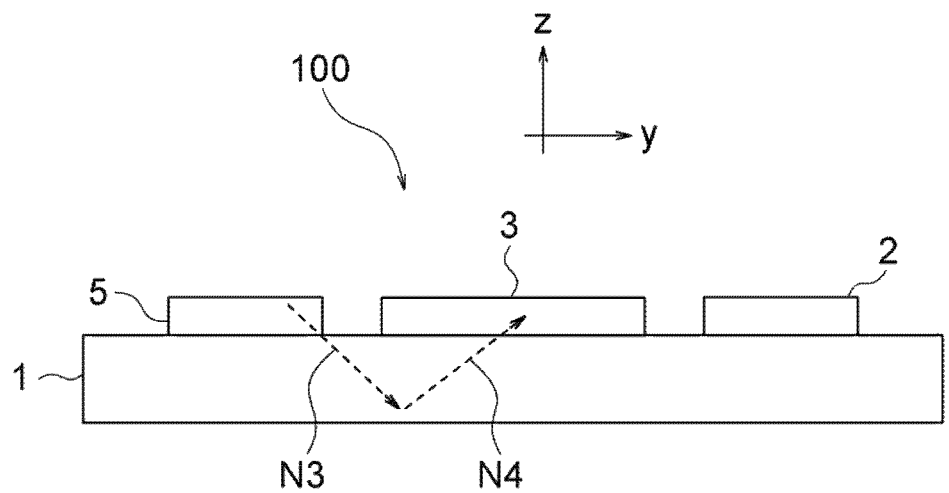
FIGS. 24A and 24B are diagrams illustrating an example of the production optical path from the first optical element included in the optical device of the first embodiment to which the present technology is applied.
Figure 24B:
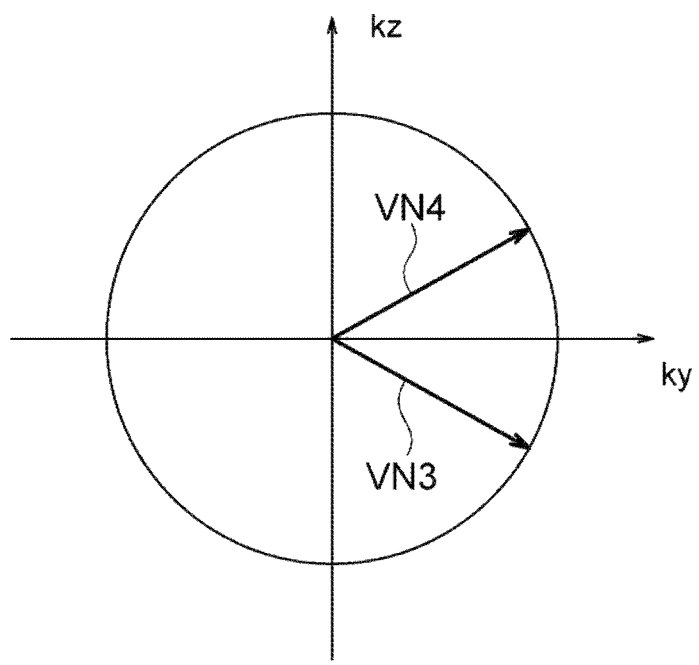

FIG. 24A is a cross-sectional view (a view (y-z plan view) of the y-axis direction and the z-axis direction) illustrating a production optical path-15 from the first optical element 5 included in the optical device 100 when observed in the direction of the arrow P21 by the observer's eyes 501 illustrated in FIG. 21. FIG. 24B is a vector diagram of the production optical path-15 from the first optical element 5 illustrated in FIG. 24A. FIG. 24B is the kykz coordinate system represented by two coordinate axes of the ky axis (the horizontal direction in FIG. 24B) and the kz axis (the vertical direction in FIG. 24B).

Figure 25A:
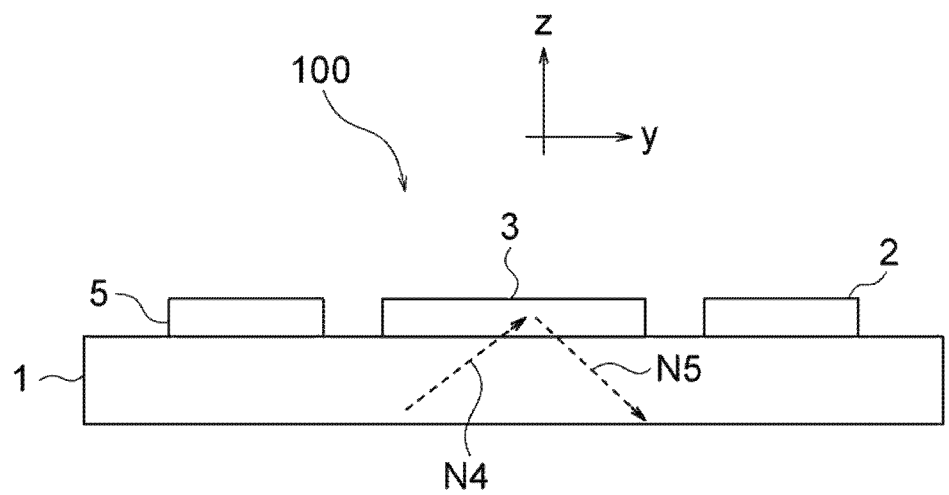
FIGS. 25A and 25B are diagrams illustrating an example of the production optical path from the first optical element included in the optical device of the first embodiment to which the present technology is applied.
Figure 25B:
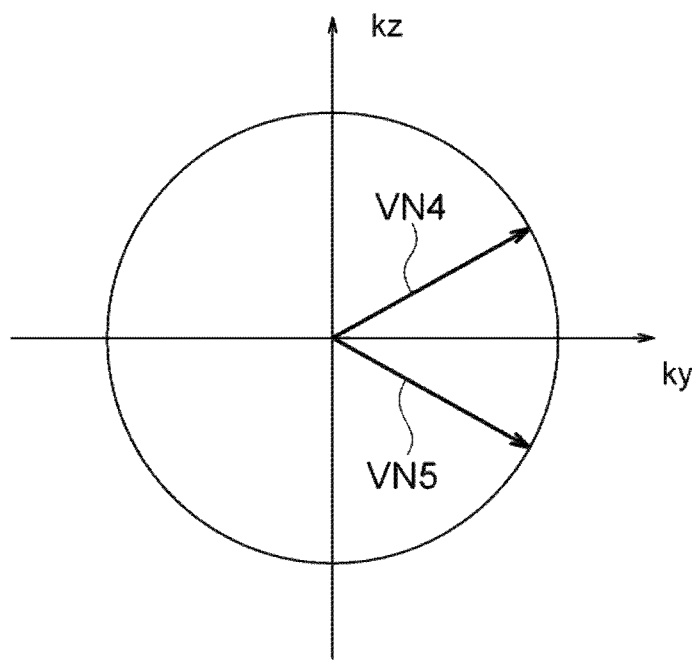

FIG. 25A is a cross-sectional view (a view (y-z plan view) of the y-axis direction and the z-axis direction) illustrating a production optical path-16 from the first optical element 5 included in the optical device 100 when observed in the direction of the arrow P21 by the observer's eyes 501 illustrated in FIG. 21. FIG. 25B is a vector diagram of the production optical path-16 from the first optical element 5 illustrated in FIG. 25A. FIG. 25B is the kykz coordinate system represented by two coordinate axes of the ky axis (the horizontal direction in FIG. 25B) and the kz axis (the vertical direction in FIG. 25B).

Figure 26:
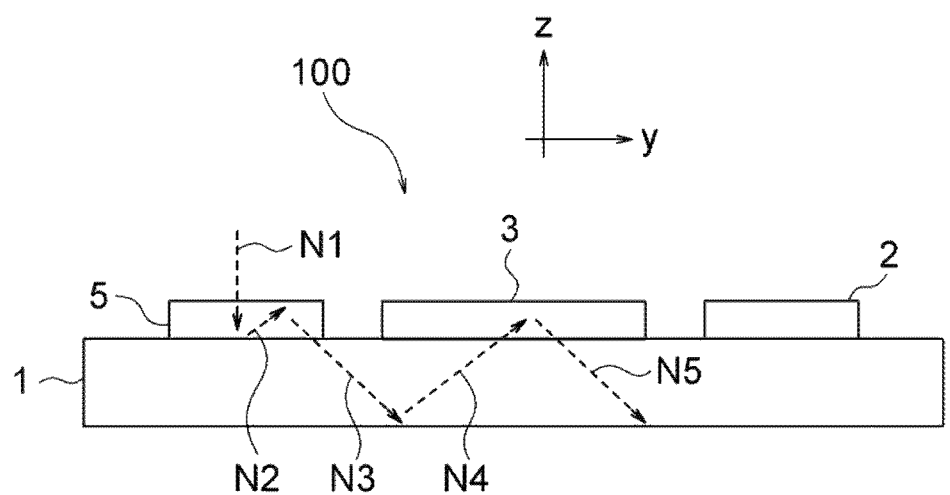
FIG. 26 is a diagram illustrating an example of the production optical path from the first optical element included in the optical device of the first embodiment to which the present technology is applied.

FIG. 26 is a cross-sectional view (a view (y-z plan view) of the y-axis direction and the z-axis direction) illustrating a production optical path-1316 obtained by combining the production optical path-13 to the production optical path-16 from the first optical element 5 included in the optical device 100.

Figure 27A:
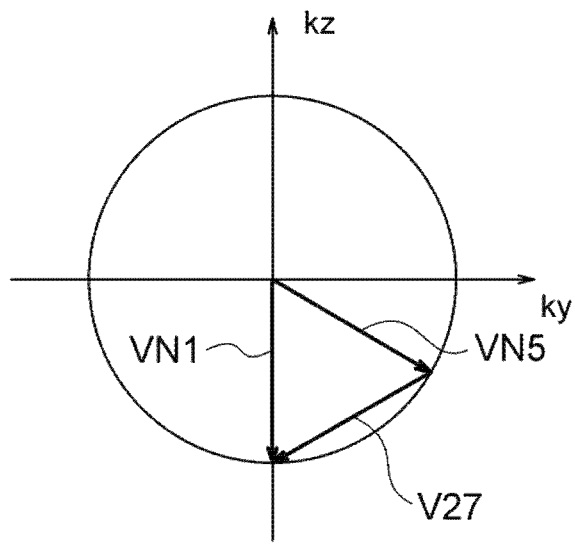
FIG. 27A is a vector diagram of the production optical path from the first optical element illustrated in FIG. 26.
Figure 27B:
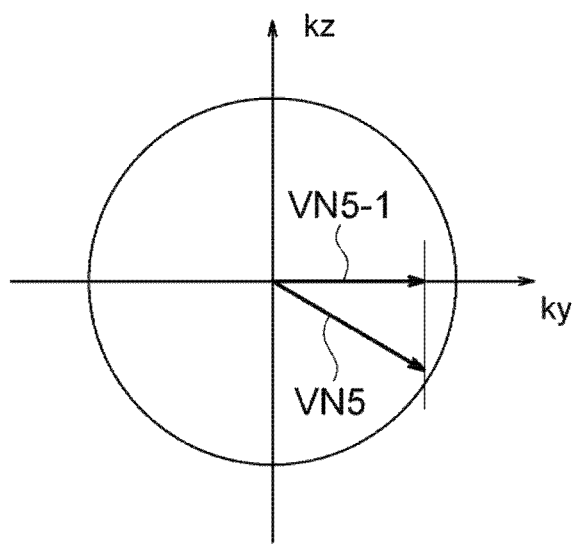
FIG. 27B is a vector diagram of the production optical path from the first optical element illustrated in FIG. 26.
Figure 27C:
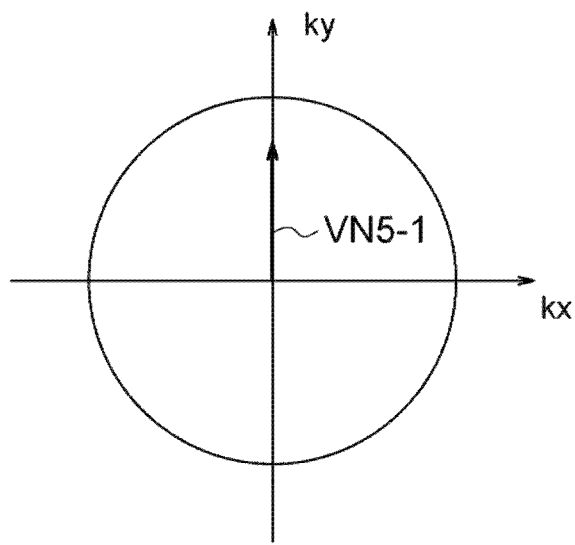
FIG. 27C is a vector diagram of the production optical path from the first optical element illustrated in FIG. 26.

FIG. 27A is a vector diagram of the production optical path-1316 from the first optical element 5 illustrated in FIG. 26. FIG. 27A is the kykz coordinate system represented by two coordinate axes of the ky axis (the horizontal direction in FIG. 27A) and the kz axis (the vertical direction in FIG. 27A). FIG. 27B is a vector diagram of the production optical path-1316 from the first optical element 5 illustrated in FIG. 26. FIG. 27B is the kykz coordinate system represented by two coordinate axes of the ky axis (the horizontal direction in FIG. 27B) and the kz axis (the vertical direction in FIG. 27B). FIG. 27C is a vector diagram of the production optical path-1316 from the first optical element 5 illustrated in FIG. 26. FIG. 27C is the kxky coordinate system represented by two coordinate axes of the kx axis (the horizontal direction in FIG. 27C) and the ky axis (the vertical direction in FIG. 27C).

As illustrated in FIGS. 22A, 23A, 24A, 25A, and 26, in order from the left side of FIGS. 22A, 23A, 24A, 25A, and 26, the first optical element 5 is disposed on the light guide plate 1 (which is a surface in the x-axis direction and the y-axis direction and is the upper surface in FIGS. 22A, 23A, 24A, 25A, and 26), the second optical element 3 is disposed on the light guide plate 1 (which is a surface in the x-axis direction and the y-axis direction and is the upper surface in FIGS. 22A, 23A, 24A, 25A, and 26), and the input optical element 2 is disposed on the light guide plate 1 (which is a surface in the x-axis direction and the y-axis direction and is the upper surface in FIGS. 22A, 23A, 24A, 25A, and 26).

When reference light N1 having a substantially opposite vector to the reproduction reference light L1 is incident on the first optical element 5, diffracted light N2 is generated as illustrated in FIG. 22A.

As illustrated in FIG. 22B, a grating vector V51 (here, k vector production) can be expressed by a relationship between a vector VN1 of the reference light N1 and a vector VN2 of the diffracted light N2.

As illustrated in FIG. 23A, similarly to the case of the input optical element 2 described above, propagation is performed with total reflection, but the magnitudes of the kx and ky components of the vector VN2 of the diffracted light N2 and the vector VN3 of the reflected light N3 do not change (FIG. 23B).

Furthermore, as illustrated in FIG. 24A, similarly to the case of the input optical element 2 described above, propagation is performed with total reflection, but the magnitudes of the kx and ky components of the vector VN3 of the reflected light N3 and the vector VN4 of the reflected light N4 do not change (FIG. 24B).

Further, as illustrated in FIG. 25A, similarly to the case of the input optical element 2 described above, propagation is performed with total reflection, but the magnitudes of the kx and ky components of the vector VN4 of the reflected light N4 and the vector VN5 of the reflected light N5 do not change (FIG. 25B).

The reference light N1 incident on the first optical element 5 to the reflection by the second optical element 3 are combined as illustrated in FIG. 26. As illustrated in FIG. 27A, a grating vector (here, k vector'production) V27 can be expressed by the vector VN1 of the reference light N1 and the vector VN5 of the reflected light N5. In the grating vector V17 (represented by the k vector"input) and the grating vector (k vector'production) V27, the ky components have substantially the same magnitude but substantially opposite directions.

Furthermore, when a positive oblique shadow of the vector VN5 of the reflected light N5 emitted from the second optical element 3 on the ky axis is set as a vector VN5-1, the vector VN5-1 can be expressed in the kx axis/ky axis space as illustrated in FIG. 27C.

Finally, formation of the second optical element will be described with reference to a vector diagram illustrated in FIG. 28.

Figure 28:
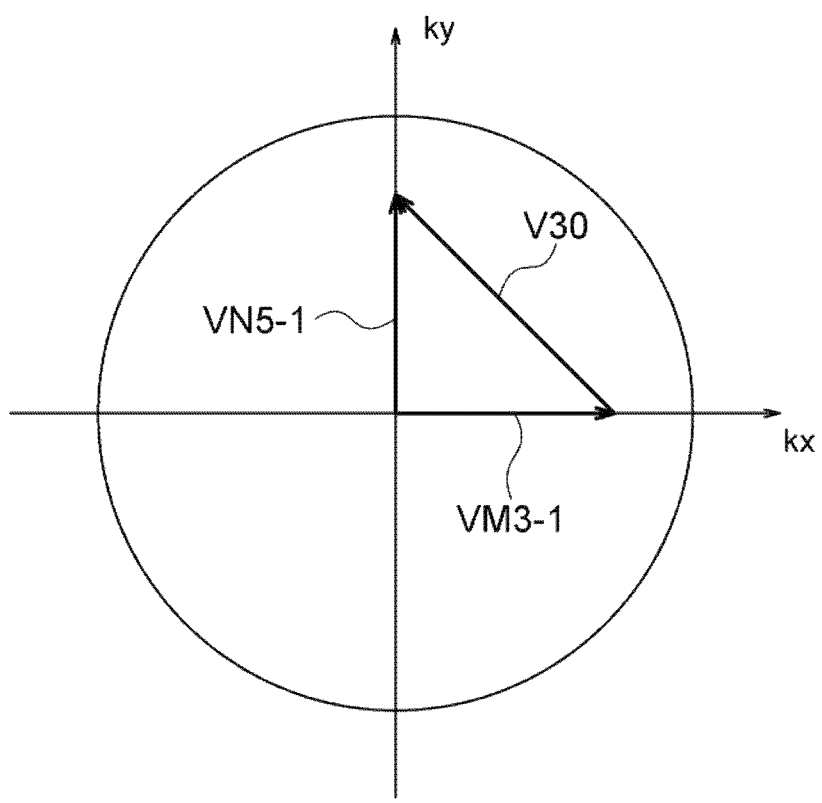
FIG. 28 is a vector diagram at the time of producing the second optical element.

FIG. 28 is the vector diagram at the time of producing the second optical element 3 and is the kxky coordinate system represented by two coordinate axes of the kx axis (the horizontal direction in FIG. 28) and the ky axis (the vertical direction in FIG. 28).

When the object light M1 and the reference light N1 having vectors substantially opposite to each other at the time of reproduction are incident on each of the output optical element 4 and the first optical element 5, light having the vector VM3-1 illustrated in FIG. 20C and light having the vector VN5-1 illustrated in FIG. 27C are incident on the second optical element 3.

By using the second optical element 3 as the volume hologram, an interference between the above-described two beams of light (the light having the vector VM3-1 and the light having the vector VN5-1) forms an interference fringe having a grating vector V30 (k vector'$_{intermediate}$) illustrated in FIG. 28 (grating vector V30 (k vector'$_{intermediate}$)=vector VN5-1−vector VM3-1). The grating vector V30 (k vecto-r'$_{intermediate}$) and the grating vector (k vector intermediate) V13 illustrated in FIG. 4 are substantially opposite vectors, and it can be understood that interference fringes having the same function are formed on the basis of the conjugation property of the interference fringe.

As a first modification of the optical device of the first embodiment (Example 1 of the optical device and Example 1 of the method for manufacturing the optical device) according to the present technology, in at least a part (at least a part of the angle of view of the image display device) of each optical element of the optical device of the first embodiment according to the present technology, the grating vector at the time of reproduction may not be closed (the sum of the grating vectors may not be zero).

A second modification of the optical device of the first embodiment (Example 1 of the optical device and Example 1 of the method for manufacturing the optical device) according to the present technology is an optical device in which the light guide plate 1 has a first surface and a second surface facing the first surface, the input optical element 2 is disposed on the first surface of the light guide plate 1, the first optical element 5 is disposed on the second surface of the light guide plate 1, the second optical element 3 is disposed in the light guide plate 1, and the first optical element 5 and the input optical element 2 are disposed to face each other with the second optical element 3 interposed therebetween. In the second modification of the optical device of the first embodiment according to the present technology, total reflection in the light guide plate 1 may not be used, and diffracted light of light (light beam) incident on each optical element may be directly incident on the next optical element.

In a third modification of the optical device of the first embodiment (Example 1 of the optical device and Example 1 of the method for manufacturing the optical device) according to the present technology, the input optical element 2 includes a light reflecting member (for example, a mirror). In the third modification of the optical device of the first embodiment according to the present technology, reflected light by the light reflecting member included in the input optical element 2 is used. Note that in any one embodiment of the optical devices of second to eighth embodiments according to the present technology, the input optical element 2 may include the light reflecting member.

As described above, unless there is a particular technical contradiction, the contents described for the optical device of the first embodiment (Example 1 of the optical device and Example 1 of the method for manufacturing the optical device) according to the present technology and the method for manufacturing the optical device can be applied to the optical devices of the second to fifth embodiments, the sixth and seventh optical devices, and the methods for manufacturing the optical devices described later according to the present technology.

3. Second Embodiment (Example 2 of Optical Device)

An optical device of a second embodiment (Example 2 of the optical device) according to the present technology will be described with reference to FIGS. 29A and 29B.

Figure 29A:
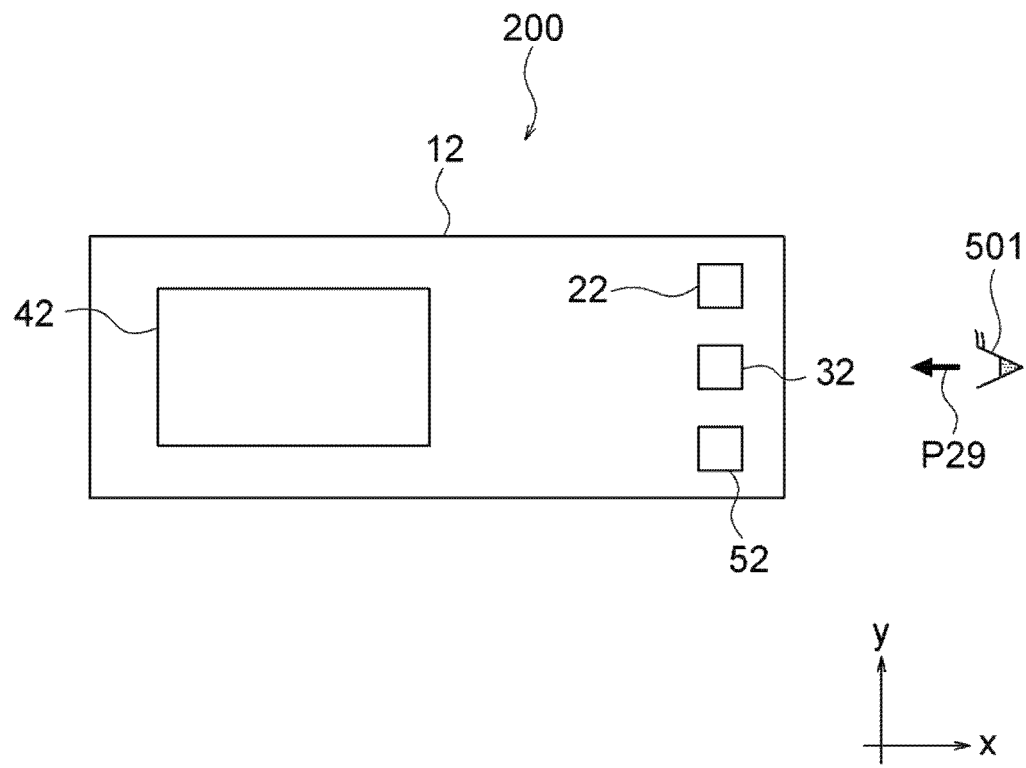
FIGS. 29A and 29B are diagrams illustrating a configuration example of an optical device of a second embodiment to which the present technology is applied.
Figure 29B:
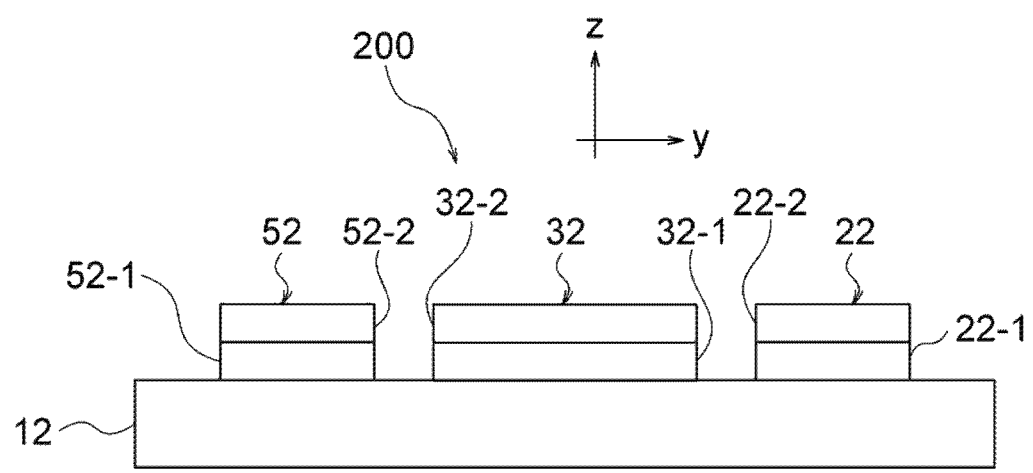

FIGS. 29A and 29B are diagrams illustrating a configuration example of the optical device (optical device 200) of the second embodiment (Example 2 of the optical device) according to the present technology. FIG. 29A is a plan view (a planar layout view, a view (x-y plan view) of the x-axis direction and the y-axis direction) of the optical device 200 according to the second embodiment of the present technology, and FIG. 29B is a cross-sectional view (a view (y-z plan view) of the y-axis direction and the z-axis direction) of the optical device 200 according to the second embodiment of the present technology when observed in the direction of an arrow P29 by the observer's eyes 501 illustrated in FIG. 29A.

As illustrated in FIG. 29A, the optical device 200 includes a light guide plate 12 which totally reflects and guides incident light, a laminate 52 of the first optical elements which is disposed on the light guide plate 12, a laminate 22 of the input optical elements which is disposed on the light guide plate 12 and introduces the incident light into the light guide plate 12, a laminate 32 of the second optical elements which is disposed on the light guide plate 12 and bends light propagated, by total reflection, in the light guide plate 12 in a direction different from a direction of the light, and a laminate 42 of the output optical elements which is disposed on the light guide plate 12 and emits light propagated, by total reflection, in the light guide plate 12 to the outside of the light guide plate 12. In the optical device 200, the laminate 52 of the first optical elements has substantially the same grating vector as the grating vector of the laminate 22 of the input optical elements. Then, the laminate 52 of the first optical elements and the laminate 22 of the input optical elements are disposed to face each other with the laminate 32 of the second optical elements interposed therebetween.

As illustrated in FIG. 29B, the laminate 52 of the first optical elements includes a first optical element 52-1 and a first optical element 52-2, the laminate 32 of the second optical elements includes a second optical element 32-1 and a second optical element 32-2, and the laminate 22 of the input optical elements includes an input optical element 22-1 and an input optical element 22-2.

The first optical element 52-1 and the first optical element 52-2 are laminated in this order (z-axis direction) on the light guide plate 12 (which is a surface in the x-axis direction and the y-axis direction and is the upper surface in FIG. 29B), the second optical element 32-1 and the second optical element 32-2 are laminated in this order (z-axis direction) on the light guide plate 12 (which is a surface in the x-axis direction and the y-axis direction and is the upper surface in FIG. 29B), and the input optical element 22-1 and the input optical element 22-2 are laminated in this order (z-axis direction) on the light guide plate 12 (which is a surface in the x-axis direction and the y-axis direction and is the upper surface in FIG. 29B). Note that, although not illustrated in FIG. 29B, the laminate 42 of the output optical elements is also configured by laminating a plurality of output optical elements on the light guide plate 12 (which is a surface in the x-axis direction and the y-axis direction and is the upper surface in FIG. 29B) in the z-axis direction.

According to the optical device 200, the first optical elements are configured as the laminate 52, the second optical elements are configured as the laminate 32, the input optical elements are configured as the laminate 22, and the output optical elements are configured as the laminate 42. Thus, space saving can be achieved by sharing the coordinates on the light guide plate 12.

As described above, unless there is a particular technical contradiction, the contents described for the optical device of the second embodiment (Example 2 of the optical device) according to the present technology can be applied to the optical device of the first embodiment and the method for manufacturing the optical device described above according to the present technology, and further to the optical devices of the third to fifth embodiments, the sixth and seventh optical devices, and the methods for manufacturing the optical devices described later according to the present technology.

4. Third Embodiment (Example 3 of Optical Device)

An optical device of a third embodiment (Example 3 of the optical device) according to the present technology will be described with reference to FIGS. 30A and 30B.

Figure 30A:
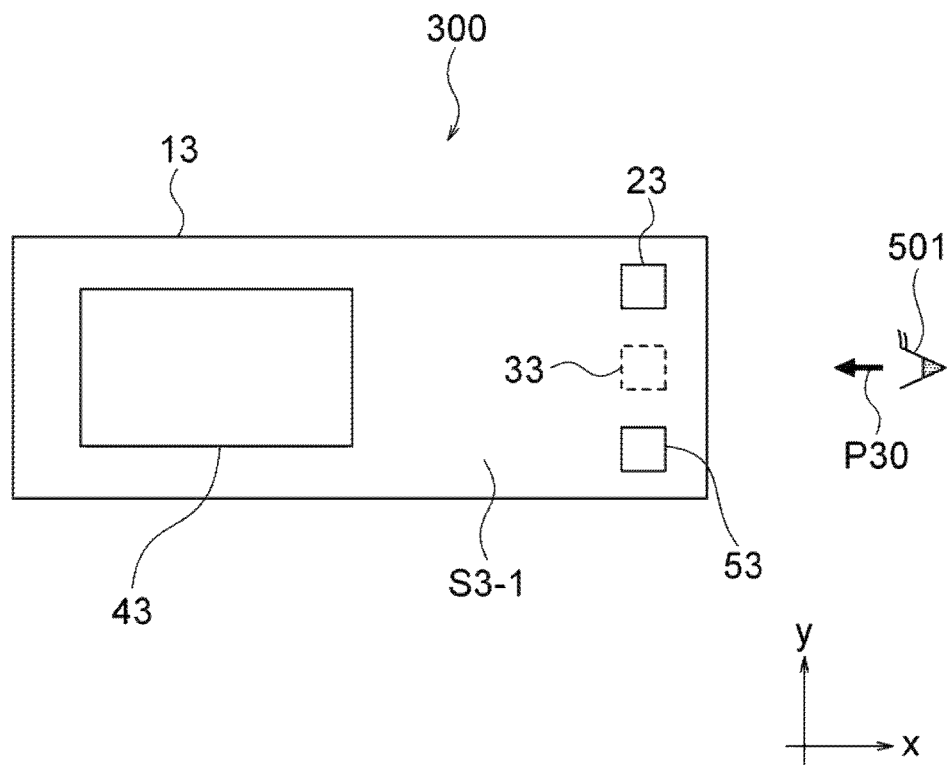
FIGS. 30A and 30B are diagrams illustrating a configuration example of an optical device of a third embodiment to which the present technology is applied.
Figure 30B:
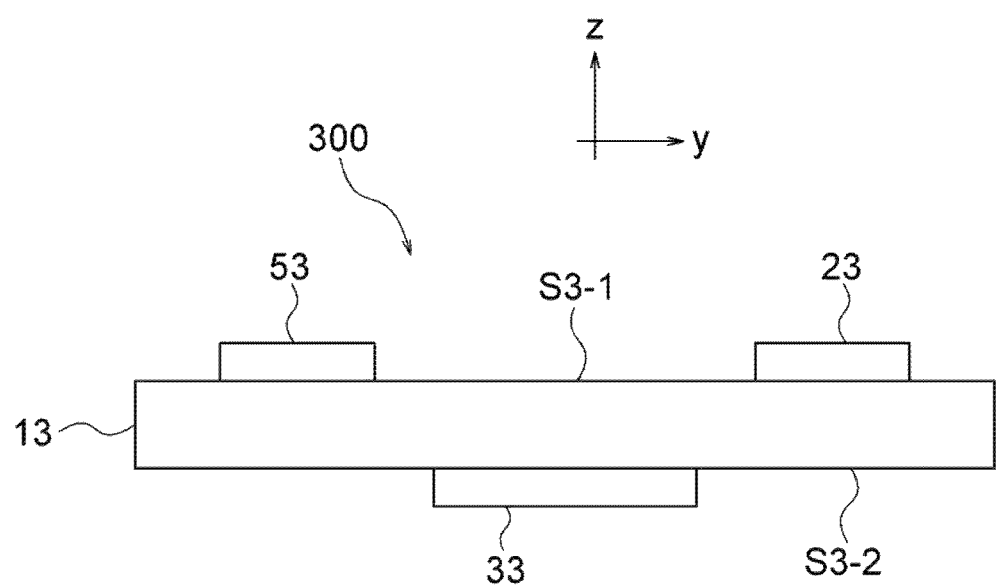

FIGS. 30A and 30B are diagrams illustrating a configuration example of the optical device (optical device 300) of the third embodiment (Example 3 of the optical device) according to the present technology. FIG. 30A is a plan view (a planar layout view, a view (x-y plan view) of the x-axis direction and the y-axis direction) of the optical device 300 according to the third embodiment of the present technology, and FIG. 30B is a cross-sectional view (a view (y-z plan view) of the y-axis direction and the z-axis direction) of the optical device 300 according to the third embodiment of the present technology when observed in the direction of an arrow P30 by the observer's eyes 501 illustrated in FIG. 30A.

As illustrated in FIG. 30A, the optical device 300 includes a light guide plate 13 which totally reflects and guides incident light, a first optical element 53 which is disposed on the light guide plate 13, an input optical element 23 which is disposed on the light guide plate 13 and introduces the incident light into the light guide plate 13, a second optical element 33 which is disposed on the light guide plate 13 and bends light propagated, by total reflection, in the light guide plate 13 in a direction different from a direction of the light, and an output optical element 43 which is disposed on the light guide plate 13 and emits light propagated, by total reflection, in the light guide plate 13 to the outside of the light guide plate 13. In the optical device 300, the first optical element 53 has substantially the same grating vector as the grating vector of the input optical element 22. Then, the first optical element 53 and the input optical element 23 are disposed to face each other with the second optical element 33 interposed therebetween.

The first optical element 53 is disposed on an upper surface S3-1 (which is a surface in the x-axis direction and the y-axis direction and is the upper surface in FIG. 30B) of the light guide plate 13, and the input optical element 23 is disposed on the upper surface S3-1 (which is a surface in the x-axis direction and the y-axis direction and is the upper surface in FIG. 30B) of the light guide plate 13. On the other hand, the second optical element 33 is disposed on a lower surface S3-2 (which is a surface in the x-axis direction and the y-axis direction and is the lower surface in FIG. 30B) of the light guide plate 13. Note that, although not illustrated in FIG. 30B, the output optical element 43 is disposed on the upper surface S3-1 (which is a surface in the x-axis direction and the y-axis direction and is the upper surface in FIG. 30B) of the light guide plate 13.

According to the optical device 300, the first optical element 53 and the input optical element 23 are disposed on the upper surface S3-1 of the light guide plate 13, and the second optical element 33 is disposed on the lower surface S3-2 of the light guide plate 13. Thus, space saving can be achieved by sharing the coordinates on the light guide plate 13.

As described above, unless there is a particular technical contradiction, the contents described for the optical device of the third embodiment (Example 3 of the optical device) according to the present technology can be applied to the optical device of the first embodiment and the method for manufacturing the optical device described above according to the present technology and the optical device of the second embodiment according to the present technology, and further to the optical devices of the fourth and fifth embodiments described later according to the present technology, the sixth and seventh optical devices, and the methods for manufacturing the optical devices.

5. Fourth Embodiment (Example 4 of Optical Device)

An optical device of a fourth embodiment (Example 4 of the optical device) according to the present technology will be described with reference to FIGS. 31A and 31B.

Figure 31A:
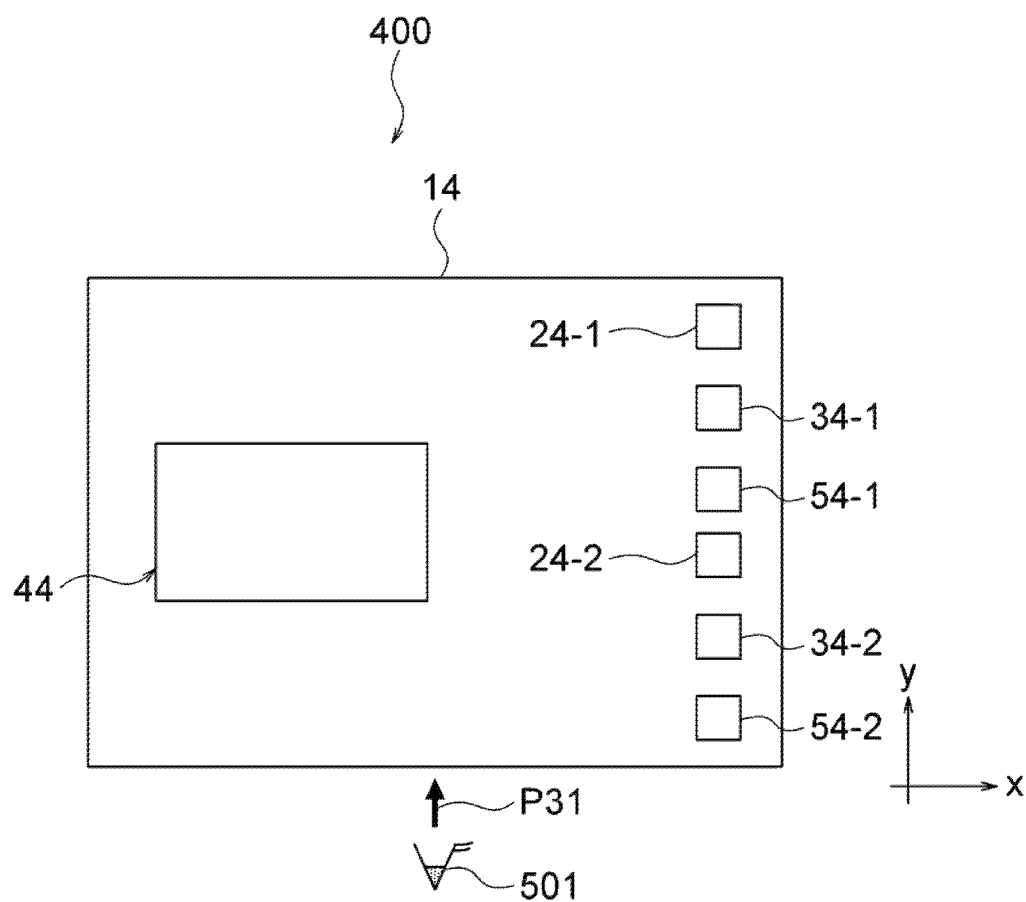
FIGS. 31A and 31B are diagrams illustrating a configuration example of an optical device of a fourth embodiment to which the present technology is applied.
Figure 31B:
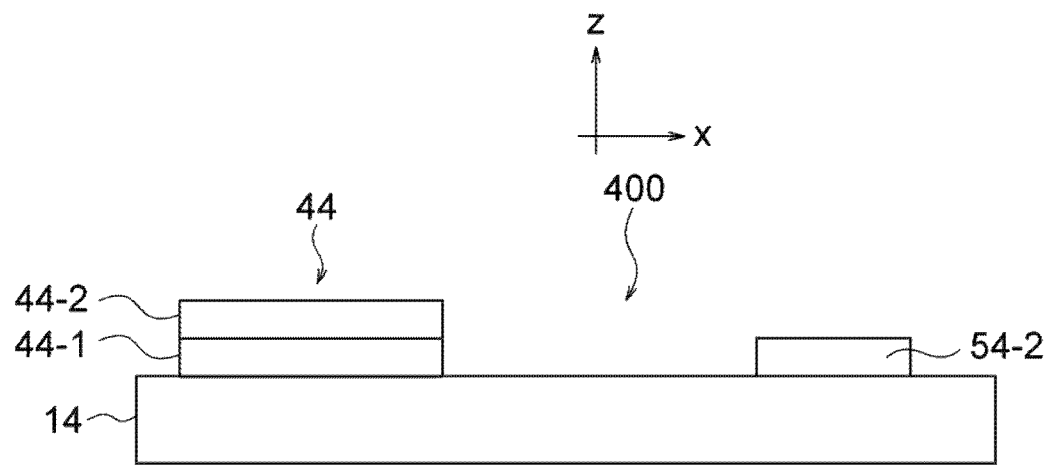

FIGS. 31A and 31B are diagrams illustrating a configuration example of the optical device (optical device 400) of the fourth embodiment (Example 4 of the optical device) according to the present technology. FIG. 31A is a plan view (a planar layout view, a view (x-y plan view) of the x-axis direction and the y-axis direction) of the optical device 400 according to the fourth embodiment of the present technology, and FIG. 31B is a cross-sectional view (a view (y-z plan view) of the y-axis direction and the z-axis direction) of the optical device 400 according to the fourth embodiment of the present technology when observed in the direction of an arrow P31 by the observer's eyes 501 illustrated in FIG. 31A.

As illustrated in FIG. 31A, the optical device 400 includes a light guide plate 14 which totally reflects and guides incident light, two first optical elements 54-1 and 54-2 which are disposed on the light guide plate 14, two input optical elements 24-1 and 24-2 which are disposed on the light guide plate 14 and introduce the incident light into the light guide plate 14, two second optical elements 34-1 and 34-2 which are disposed on the light guide plate 14 and bend light propagated, by total reflection, in the light guide plate 14 in a direction different from a direction of the light, and a laminate 44 of the output optical elements which is disposed on the light guide plate 14 and emits light propagated, by total reflection, in the light guide plate 14 to the outside of the light guide plate 14. In the optical device 400, the first optical elements 54-1 and 54-2 have substantially the same grating vectors as the grating vectors of the input optical elements 24-1 and 24-2. Then, the first optical element 54-1 and the input optical element 24-1 are disposed to face each other with the second optical element 34-1 interposed therebetween, and the first optical element 54-2 and the input optical element 24-2 are disposed to face each other with the second optical element 34-2 interposed therebetween.

The input optical element 24-1, the second optical element 34-1, and the first optical element 54-1 are disposed in this order from the upper side of FIG. 31A, and one set is configured by the input optical element 24-1, the second optical element 34-1, and the first optical element 54-1. Then, the input optical element 24-2, the second optical element 34-2, and the first optical element 54-2 are disposed in this order from the upper side of FIG. 31A, and another set is configured by the input optical element 24-2, the second optical element 34-2, and the first optical element 54-2. These two sets are disposed in the vertical direction in FIG. 31A. Note that although FIG. 31A illustrates two sets as described above, the optical device 400 may include three or more sets.

The first optical element 54-2 is disposed on the light guide plate 14 (which is a surface in the x-axis direction and the y-axis direction and is the upper surface in FIG. 31B). The laminate 44 of the output optical elements includes the output optical elements 44-1 and 44-2, and the output optical element 44-1 and the output optical element 44-2 are laminated in this order (lamination in the z-axis direction) on the light guide plate 14 (which is a surface in the x-axis direction and the y-axis direction and is the upper surface in FIG. 31B). Note that, although not illustrated in FIG. 31B, each of the second optical element 34-2, the input optical element 24-2, the first optical element 54-1, the second optical element 34-1, and the input optical element 24-1 is disposed on the light guide plate 14 (which is a surface in the x-axis direction and the y-axis direction and is the upper surface in FIG. 31B).

In the optical device 400, the input optical element 24-1, the second optical element 34-1, the first optical element 54-1, the input optical element 24-2, the second optical element 34-2, the first optical element 54-2, and, further, the laminate 44 of the output optical elements are disposed on the light guide plate 14 such that the sum of a plurality of grating vectors becomes zero (the grating vectors are closed).

As described above, unless there is a particular technical contradiction, the contents described for the optical device of the fourth embodiment (Example 4 of the optical device) according to the present technology can be applied to the optical device of the first embodiment and the method for manufacturing the optical device described above according to the present technology and the optical devices of the second and third embodiments according to the present technology, and further to the optical device of the fifth embodiment, the sixth and seventh optical devices, and the methods for manufacturing the optical devices according to the present technology described later.

6. Fifth Embodiment (Example 5 of Optical Device)

An optical device of a fifth embodiment (Example 5 of the optical device) according to the present technology will be described with reference to FIGS. 32A and 32B.

Figure 32A:
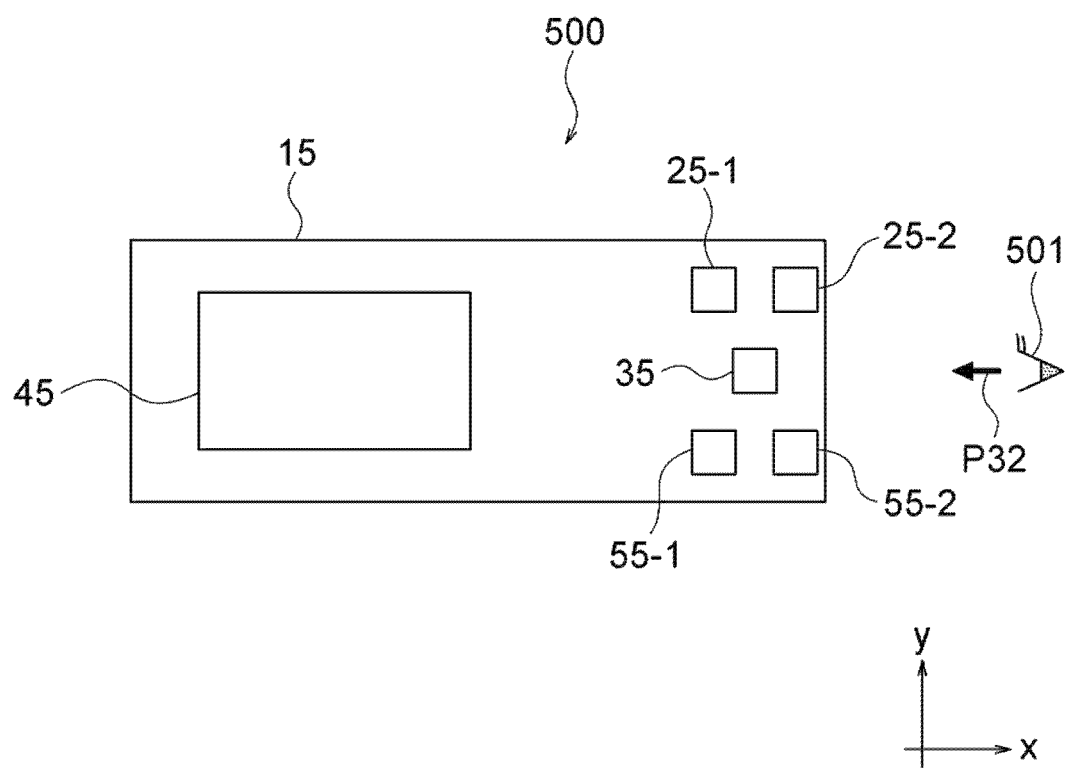
FIGS. 32A and 32B are diagrams illustrating a configuration example of an optical device of a fifth embodiment to which the present technology is applied.
Figure 32B:
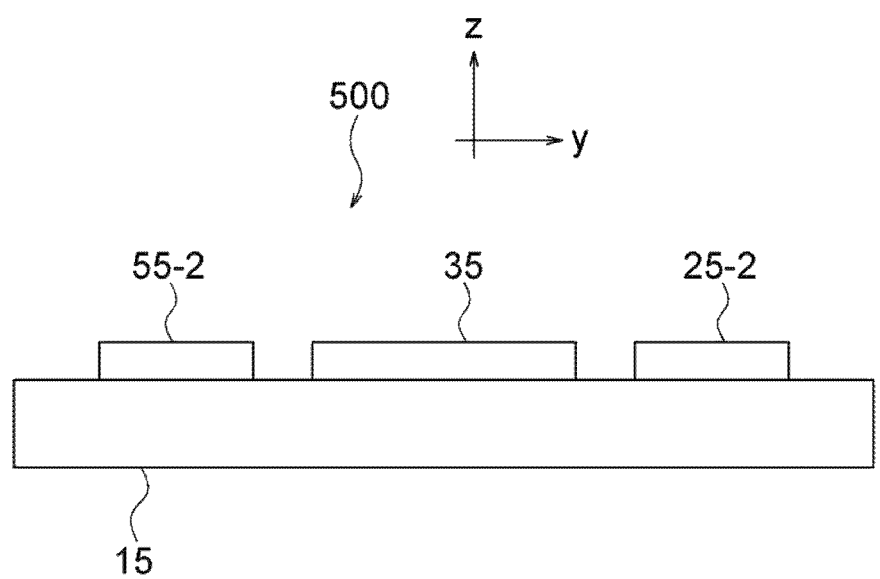

FIGS. 32A and 32B are diagrams illustrating a configuration example of the optical device (optical device 500) of the fifth embodiment (Example 5 of the optical device) according to the present technology. FIG. 32A is a plan view (a planar layout view, a view (x-y plan view) of the x-axis direction and the y-axis direction) of the optical device 500 according to the fifth embodiment of the present technology, and FIG. 32B is a cross-sectional view (a view (y-z plan view) of the y-axis direction and the z-axis direction) of the optical device 500 according to the fifth embodiment of the present technology when observed in the direction of an arrow P32 by the observer's eyes 501 illustrated in FIG. 32A.

As illustrated in FIG. 32A, the optical device 500 includes a light guide plate 15 which totally reflects and guides incident light, two first optical elements 55-1 and 55-2 which are disposed on the light guide plate 15, two input optical elements 25-1 and 25-2 which are disposed on the light guide plate 15 and introduce the incident light into the light guide plate 15, a second optical element 35 which is disposed on the light guide plate 14 and bends light propagated, by total reflection, in the light guide plate 15 in a direction different from a direction of the light, and an output optical element 45 which is disposed on the light guide plate 15 and emits light propagated, by total reflection, in the light guide plate 15 to the outside of the light guide plate 14. In the optical device 500, the first optical elements 55-1 and 55-2 have substantially the same grating vectors as the grating vectors of the input optical elements 25-1 and 25-2. Then, the two first optical elements 55-1 and 55-2 and the two input optical elements 25-1 and 25-2 are disposed to face each other with the second optical element 35 interposed therebetween.

The first optical element 55-2 is disposed on the light guide plate 15 (which is a surface in the x-axis direction and the y-axis direction and is the upper surface in FIG. 32B), the second optical element 35 is disposed on the light guide plate 15 (which is a surface in the x-axis direction and the y-axis direction and is the upper surface in FIG. 32B), and the input optical element 25-2 is disposed on the light guide plate 15 (which is a surface in the x-axis direction and the y-axis direction and is the upper surface in FIG. 32B). Note that, although not illustrated in FIG. 32B, each of the first optical element 55-1, the input optical element 25-1, and the output optical element 45 is disposed on the light guide plate 15 (which is a surface in the x-axis direction and the y-axis direction and is the upper surface in FIG. 32B).

In the optical device 500, at least two types of interference fringes can be formed in the second optical element 35 by using the light emitted from each of the two first optical elements 55-1 and 55-2 (so-called multiple exposure). Note that, for example, at least two types of interference fringes may be formed in the output optical element by multiple exposure using at least two first optical elements. Furthermore, as illustrated in FIGS. 29A and 29B described above, for example, by multiple exposure using the laminate 52 of the first optical elements, interference fringes different from each other can be formed respectively in the first optical element 32-1 and the second optical element 32-2 configuring the laminate 32 of the first optical elements.

As described above, unless there is a particular technical contradiction, the contents described for the optical device of the fifth embodiment (Example 5 of the optical device) according to the present technology can be applied to the optical device of the first embodiment and the method for manufacturing the optical device described above according to the present technology and the optical devices of the second to fourth embodiments according to the present technology, and further to the sixth and seventh optical devices and the methods for manufacturing the optical devices described later.

7. Sixth Embodiment (Example 6 of Optical Device and Example 2 of Method for Manufacturing Optical Device)

An optical device and a method for manufacturing the optical device according to a sixth embodiment (Example 6 of the optical device and Example 2 of the method for manufacturing the optical device) of the present technology will be described with reference to FIG. 33A.

Figure 33A:
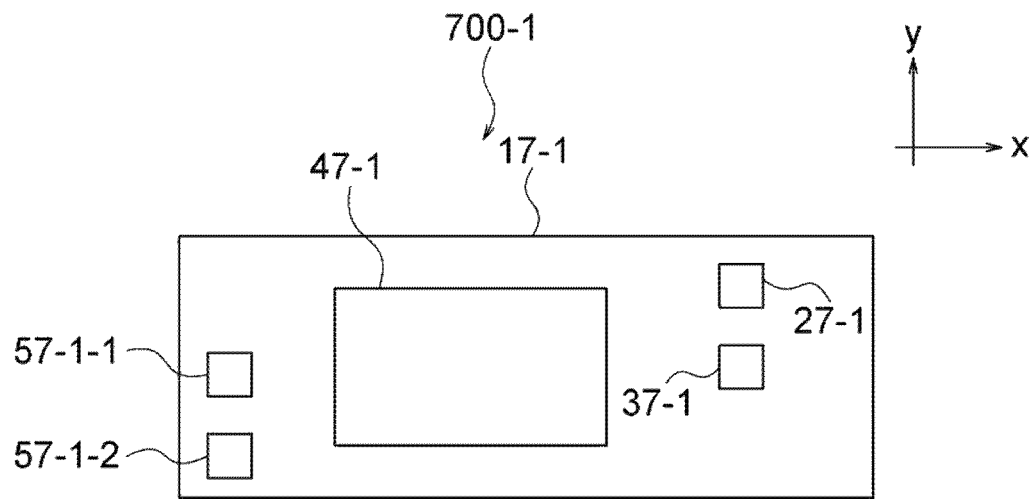
FIG. 33A is a diagram illustrating a configuration example of an optical device of a sixth embodiment to which the present technology is applied.

FIG. 33A is a diagram illustrating a configuration example of the optical device (optical device 700-1) of the sixth embodiment (Example 6 of the optical device) according to the present technology. FIG. 33A is a plan view (a planar layout view, a view (x-y plan view) of the x-axis direction and the y-axis direction) of the optical device 700-1 according to the sixth embodiment of the present technology.

The optical device 700-1 includes a light guide plate 17-1 which totally reflects and guides incident light, a first optical element 57-1-1 which is disposed on the light guide plate 17-1, an input optical element 27-1 which is disposed on the light guide plate 17-1 and introduces the incident light into the light guide plate 17-1, a second optical element 37-1 which is disposed on the light guide plate 17-1 and bends light propagated, by total reflection, in the light guide plate 17-1 in a direction different from a direction of the light, a third optical element 57-1-2 which is disposed on the light guide plate 17-1, and an output optical element 47-1 which is disposed on the light guide plate 17-1 and emits light propagated, by total reflection, in the light guide plate 17-1 to the outside of the light guide plate 17-1. The first optical element 57-1-1 has substantially the same grating vector as the grating vector of the second optical element 37-1, and the third optical element 57-1-2 has substantially the same grating vector as the grating vector of the input optical element 27-1. Then, the first optical element 57-1-1 and the third optical element 57-1-2, and the second optical element 37-1 and the input optical element 27-1 are disposed to face each other with the output optical element 47-1 interposed therebetween.

First, the method for manufacturing the optical device 700-1 includes a step of forming the input optical element 27-1 on the light guide plate 17-1, a step of forming the second optical element 37-1 on the light guide plate 17-1, a step of forming the third optical element 57-1-2 having substantially the same grating vector as the grating vector of the input optical element 27-1 on the light guide plate 17-1, and a step of forming the first optical element 57-1-1 having substantially the same grating vector as the grating vector of the second optical element 37-1 on the light guide plate 17-1.

Then, in the method for manufacturing the optical device 700-1, the output optical element 47-1 can be formed by using an interference between the diffracted light (fifth diffracted light), which is obtained when the reference light having the substantially opposite vector to the vector of the reproduction reference light is incident on the third optical element 57-1-2, and the light emitted from the third optical element 57-1-2 is incident on the first optical element 57-1-1, and the object light having the substantially opposite vector to the vector of the reproduction light. The output optical element 47-1 may be a volume hologram.

As described above, unless there is a particular technical contradiction, the contents described for the optical device of the sixth embodiment (Example 6 of the optical device) according to the present technology can be applied to the optical device of the first embodiment and the method for manufacturing the optical device described above according to the present technology and the optical devices of the second to fifth embodiments according to the present technology, and further to the seventh optical device and the method for manufacturing the optical device described later.

8. Seventh Embodiment (Example 7 of Optical Device)

An optical device and a method for manufacturing the optical device according to a seventh embodiment (Example 7 of the optical device and Example 3 of the method for manufacturing the optical device) of the present technology will be described with reference to FIG. 33B.

Figure 33B:
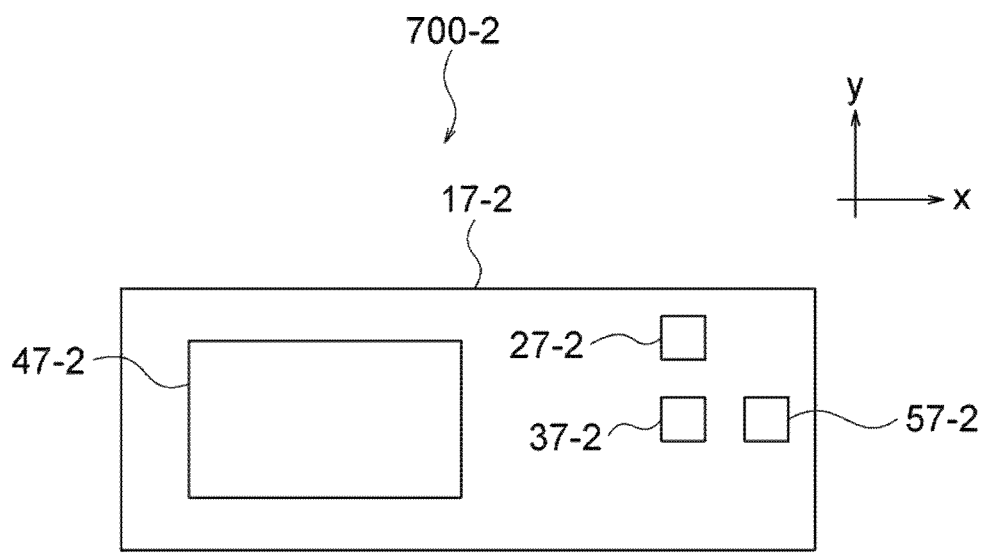
FIG. 33B is a diagram illustrating a configuration example of an optical device of a seventh embodiment to which the present technology is applied.

FIG. 33B is a diagram illustrating a configuration example of the optical device (optical device 700-2) of the seventh embodiment (Example 7 of the optical device) according to the present technology. FIG. 33B is a plan view (a planar layout view, a view (x-y plan view) of the x-axis direction and the y-axis direction) of an optical device 700-2 according to the seventh embodiment of the present technology.

The optical device 700-2 includes a light guide plate 17-2 which totally reflects and guides incident light, a first optical element 57-2 which is disposed on the light guide plate 17-2, an input optical element 27-2 which is disposed on the light guide plate 17-2 and introduces the incident light into the light guide plate 17-2, a second optical element 37-2 which is disposed on the light guide plate 17-2 and bends light propagated, by total reflection, in the light guide plate 17-2 in a direction different from a direction of the light, and an output optical element 47-2 which is disposed on the light guide plate 17-2 and emits light propagated, by total reflection, in the light guide plate 17-2 to the outside of the light guide plate 17-2. The first optical element 57-2 has substantially the same grating vector as the grating vector of the output optical element 47-2. Then, the first optical element 57-2 and the output optical element 47-2 are disposed to face each other with the second optical element 37-2 interposed therebetween.

First, the method for manufacturing the optical device 700-2 includes a step of forming the input optical element 27-2 on the light guide plate 17-2, a step of forming the output optical element 47-2 on the light guide plate 17-2, and a step of forming the first optical element 57-2 having substantially the same grating vector as the grating vector of the output optical element 47-2 on the light guide plate 17-2.

Then, in the method for manufacturing the optical device 700-2, the second optical element 37-2 can be formed by using an interference between the diffracted light (third diffracted light), which is obtained when the object light having substantially the same vector as the vector of the reproduction light is incident on the first optical element 57-2, and the diffracted light (fourth diffracted light), which is obtained when the reference light having substantially the same vector as the vector of the reproduction reference light is incident on the input optical element 27-2. The second optical element 37-2 may be a volume hologram.

As described above, unless there is a particular technical contradiction, the contents described for the optical device of the seventh embodiment (Example 7 of the optical device) according to the present technology can be applied to the optical devices of the first and sixth embodiments and the methods of manufacturing the optical devices described above according to the present technology, and further to the optical devices of the second to fifth embodiments according to the present technology.

9. Eighth Embodiment (Example of Image Display Device)

An image display device according to an eighth embodiment (an example of the image display device) of the present technology will be described with reference to FIG. 2.

FIG. 2 is a diagram illustrating the image display device 1000 according to the eighth embodiment (an example of the image display device) of the present technology. As described above, the image display device (reproduction optical system) 1000 includes the image forming apparatus 200 and the optical device 100. The image forming apparatus 200 includes at least the light source 6 and the projection optical system 7, and may further include a spatial light modulation device such as a liquid crystal display device. The image display device 1000 can be applied to, for example, an eyewear display, a head mounted display, or the like.

The light source 6 may be configured by a light emitting element, and specific examples of the light emitting element may include a red light emitting element, a green light emitting element, a blue light emitting element, and a white light emitting element, and white light may be obtained by mixing red light, green light, and blue light emitted from the red light emitting element, the green light emitting element, and the blue light emitting element by using a light pipe and uniformizing luminance. Examples of the light emitting element include a semiconductor laser element, a solid-state laser, and an LED. For example, a collimating optical system which collimates the light emitted from the light source 6 may be used as the projection optical system 7.

Note that, in addition to the optical device 100, the optical device 200, the optical device 300, the optical device 400, the optical device 500, the optical device 700-1, or the optical device 700-2 also may be applied to the image display device 1000.

Note that, the embodiments according to the present technology are not limited to the above-described embodiments, and various modifications can be made without departing from the gist of the present technology.

The effects described in the present specification are merely examples and are not limited, and other effects may be provided.

The present technology can also have the following configurations.

[1]
An optical device including:
a light guide plate that totally reflects and guides incident light;
a first optical element that is disposed on the light guide plate;
an input optical element that is disposed on the light guide plate and introduces the incident light into the light guide plate;
a second optical element that is disposed on the light guide plate and bends light propagated by total reflection in the light guide plate, in a direction different from a direction of the light; and
an output optical element that is disposed on the light guide plate and emits light propagated by total reflection in the light guide plate, to an outside of the light guide plate, in which
the first optical element has substantially the same grating vector as a grating vector of the input optical element, and
the first optical element and the input optical element are disposed to face each other with the second optical element interposed therebetween.

[2]
The optical device according to [1], further including:
a plurality of the first optical elements; a plurality of the input optical elements; a plurality of the second optical elements; and a plurality of the output optical elements, in which
each of the plurality of first optical elements, the plurality of input optical elements, the plurality of second optical elements, and the plurality of output optical elements has a laminated structure.

[3]
The optical device according to [1], in which
the light guide plate has a first surface and a second surface facing the first surface,
the first optical element, the input optical element, and the output optical element are disposed on the first surface of the light guide plate, and
the second optical element is disposed on the second surface of the light guide plate.

[4]
The optical device according to [1], further including:
a plurality of the first optical elements; a plurality of the input optical elements; a plurality of the second optical elements; and a plurality of the output optical elements, in which
the input optical element, the second optical element, and the first optical element are disposed in this order on the light guide plate,
one set including the input optical element, the second optical element, and the first optical element is repeatedly disposed, and
the plurality of output optical elements has a laminated structure.

[5]
The optical device according to [1], further including:
a plurality of the first optical elements; and a plurality of the input optical elements, in which
the plurality of first optical elements and the plurality of input optical elements are disposed to face each other with the second optical element interposed therebetween.

[6]
The optical device according to [1], in which
the light guide plate has a first surface and a second surface facing the first surface,
the input optical element is disposed on the first surface of the light guide plate,
the first optical element is disposed on the second surface of the light guide plate,
the second optical element is disposed in the light guide plate, and
the first optical element and the input optical element are disposed to face each other with the second optical element interposed therebetween.

[7]
An optical device including:
a light guide plate that totally reflects and guides incident light;
a first optical element that is disposed on the light guide plate;
an input optical element that is disposed on the light guide plate and introduces the incident light into the light guide plate;
a second optical element that is disposed on the light guide plate and bends light propagated by total reflection in the light guide plate, in a direction different from a direction of the light; and
an output optical element that is disposed on the light guide plate and emits light propagated by total reflection in the light guide plate, to an outside of the light guide plate, in which
the first optical element has substantially the same grating vector as a grating vector of the output optical element, and
the first optical element and the output optical element are disposed to face each other with the second optical element interposed therebetween.

[8]
The optical device according to any one of [1] to [7], in which the input optical element includes a light reflecting member.

[9]
The optical device according to any one of [1] to [8], in which the second optical element is a reflection type or transmission type volume hologram.

[10]
An optical device including:
a light guide plate that totally reflects and guides incident light;
a first optical element that is disposed on the light guide plate;
an input optical element that is disposed on the light guide plate and introduces the incident light into the light guide plate;
a second optical element that is disposed on the light guide plate and bends light propagated by total reflection in the light guide plate, in a direction different from a direction of the light;
a third optical element that is disposed on the light guide plate; and
an output optical element that is disposed on the light guide plate and emits light propagated, by total reflection, in the light guide plate to the outside of the light guide plate, in which
the first optical element has substantially the same grating vector as a grating vector of the second optical element,
the third optical element has substantially the same grating vector as a grating vector of the input optical element, and
the first optical element and the third optical element, and the second optical element and the input optical element are disposed to face each other with the output optical element interposed therebetween.

[11]
The optical device according to [10], in which the input optical element includes a light reflecting member.

[12]
The optical device according to [10] or [11], in which the output optical element is a reflection type or transmission type volume hologram.

[13]
An image display device including:
an image forming apparatus; and
an optical device where light emitted from the image forming apparatus is incident, guided, and emitted, in which
the optical device includes the optical device according to any one of [1] to [12].

[14]
A method of manufacturing an optical device including:
forming an input optical element on a light guide plate;
forming a first optical element on the light guide plate, the first optical element having substantially the same grating vector as a grating vector of the input optical element;
forming an output optical element on the light guide plate; and
forming a second optical element by using an interference between first diffracted light obtained when reference light having a substantially opposite vector to a vector included in reproduction reference light is incident on the first optical element and second diffracted light obtained when object light having a substantially opposite vector to a vector included in reproduction light is incident on the output optical element.

[15]
A method of manufacturing an optical device including:
forming an input optical element on a light guide plate;
forming an output optical element on the light guide plate;
forming a first optical element on the light guide plate, the first optical element having substantially the same grating vector as a grating vector of the output optical element; and
forming a second optical element by using an interference between third diffracted light obtained when object light having substantially the same vector as a vector of reproduction light is incident on the first optical element and fourth diffracted light obtained when reference light having substantially the same vector as a vector of reproduction reference light is incident on the input optical element.

[16]
A method of manufacturing an optical device including:
forming an input optical element on a light guide plate;
forming a second optical element on the light guide plate;
forming a first optical element on the light guide plate, the first optical element having substantially the same grating vector as a grating vector of the second optical element;
forming a third optical element on the light guide plate, the third optical element having substantially the same grating vector as a grating vector of the input optical element; and
forming an output optical element by using an interference between fifth diffracted light, which is obtained when reference light having a substantially opposite vector to a vector of reproduction reference light is incident on the third optical element, and light emitted from the third optical element is incident on the first optical element, and object light having a substantially opposite vector to the vector of the reproduction light.

REFERENCE SIGNS LIST 1, 12, 13, 14, 15, 17-1, 17-2 Light guide plate
2, 22-1, 22-2, 23, 24-1, 24-2, 25-1, 25-2, 27-1, 27-2 Input optical element
3, 32-1, 32-2, 33, 34-1, 34-2, 35, 37-1, 37-2 Second optical element
4, 42, 43, 44-1, 44-2, 45, 47-1, 47-2 Output optical element
5, 52-1, 52-2, 53, 54-1, 54-2, 55-1, 55-2, 57-1-1, 57-2 First optical element
6 Light source
7 Projection optical system
22 Laminate of input optical elements
32 Laminate of second optical elements
42, 44 Laminate of output optical elements
52 Laminate of first optical elements
57-1-2 Third optical element
100, 200, 300, 400, 500, 700-1, 700-2 Optical device
200 Image forming apparatus
500 Pupil (eyeball)
501 Observer's eyes
1000 Image display device
L1 Reproduction reference light
L2 Diffracted light
L3 Enlarged light
L4 Reproduction light
S3-1 First surface of light guide plate
S3-1 Second surface of light guide plate

The invention claimed is:
1. An optical device, comprising:
a light guide plate configured to totally reflect and guide incident light;
a first optical element on the light guide plate;
an input optical element that is on the light guide plate and configured to introduce the incident light into the light guide plate;
a second optical element that is on the light guide plate and configured to bend light propagated by total reflection in the light guide plate, in a direction different from a direction of the light; and
an output optical element that is on the light guide plate and configured to emit the light propagated by the total reflection in the light guide plate, to an outside of the light guide plate, wherein
the first optical element has a substantially same grating vector as a grating vector of the input optical element, and
the first optical element faces the input optical element with the second optical element interposed therebetween.

2. The optical device according to claim 1, further comprising:
a plurality of first optical elements including the first optical element;
a plurality of input optical elements including the input optical element;
a plurality of second optical elements including the second optical element; and
a plurality of output optical elements including the output optical element, wherein
each of the plurality of first optical elements, the plurality of input optical elements, the plurality of second optical elements, and the plurality of output optical elements has a laminated structure.

3. The optical device according to claim 1, wherein
the light guide plate has a first surface and a second surface facing the first surface,
the first optical element, the input optical element, and the output optical element are on the first surface of the light guide plate, and
the second optical element is on the second surface of the light guide plate.

4. The optical device according to claim 1, further comprising:
a plurality of first optical elements including the first optical element;
a plurality of input optical elements including the input optical element;
a plurality of second optical elements including the second optical element, and
a plurality of output optical elements including the output optical element, wherein
the input optical element, the second optical element, and the first optical element are in this order on the light guide plate,
one set including the input optical element, the second optical element, and the first optical element is repeatedly disposed, and
the plurality of output optical elements has a laminated structure.

5. The optical device according to claim 1, further comprising:
a plurality of first optical elements including the first optical element; and
a plurality of input optical elements including the input optical element, wherein
the plurality of first optical elements faces the plurality of input optical elements with the second optical element interposed therebetween.

6. The optical device according to claim 1, wherein
the light guide plate has a first surface and a second surface facing the first surface,
the input optical element is on the first surface of the light guide plate,
the first optical element is on the second surface of the light guide plate,
the second optical element is in the light guide plate, and the first optical element faces the input optical element with the second optical element interposed therebetween.

7. The optical device according to claim 1, wherein the input optical element includes a light reflecting member.

8. The optical device according to claim 1, wherein the second optical element is a reflection type or transmission type volume hologram.

9. An image display device, comprising:
an image forming apparatus; and
an optical device where light emitted from the image forming apparatus is incident, guided, and emitted, wherein
the optical device includes the optical device according to claim 1.

10. An optical device, comprising:
a light guide plate configured to totally reflect and guide incident light;
a first optical element on the light guide plate;
an input optical element that is on the light guide plate and configured to introduce the incident light into the light guide plate;
a second optical element that is on the light guide plate and configured to bend light propagated by total reflection in the light guide plate, in a direction different from a direction of the light; and
an output optical element that is on the light guide plate and configured to emit the light propagated by the total reflection in the light guide plate, to an outside of the light guide plate, wherein
the first optical element has a substantially same grating vector as a grating vector of the output optical element, and
the first optical element faces the output optical element with the second optical element interposed therebetween.

11. The optical device according to claim 10, wherein the input optical element includes a light reflecting member.

12. The optical device according to claim 10, wherein the second optical element is a reflection type or transmission type volume hologram.

13. A method of manufacturing an optical device, comprising:
forming an input optical element on a light guide plate;
forming a first optical element on the light guide plate, the first optical element having a substantially same grating vector as a grating vector of the input optical element;
forming an output optical element on the light guide plate; and
forming a second optical element, wherein
an interference between first diffracted light obtained when reference light having a substantially opposite vector to a vector included in reproduction reference light is incident on the first optical element, and
second diffracted light obtained when object light having a substantially opposite vector to a vector included in reproduction light is incident on the output optical element.

* * * * *